United States Patent
Ding et al.

(10) Patent No.: US 6,690,534 B2
(45) Date of Patent: Feb. 10, 2004

(54) METHOD AND APPARATUS FOR HANDLING MULTIPLE RESONANCE FREQUENCIES IN DISC DRIVES USING ACTIVE DAMPING

(75) Inventors: MingZhong Ding, Singapore (SG); YangQuan Chen, Singapore (SG); LeeLing Tan, Singapore (SG); Wing Kong Chiang, Singapore (SG); KianKeong Ooi, Singapore (SG); BengWee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 201 days.

(21) Appl. No.: 09/827,339

(22) Filed: Apr. 5, 2001

(65) Prior Publication Data

US 2002/0041472 A1 Apr. 11, 2002

Related U.S. Application Data

(60) Provisional application No. 60/211,552, filed on Jun. 14, 2000.

(51) Int. Cl.[7] .............................................. G11B 5/596
(52) U.S. Cl. .................................. 360/77.02; 360/78.06
(58) Field of Search ........................ 360/77.02, 78.04, 360/78.06

(56) References Cited

U.S. PATENT DOCUMENTS

| | | | |
|---|---|---|---|
| 4,217,612 A | 8/1980 | Matla et al. ................... 360/78 |
| 4,775,903 A | 10/1988 | Knowles ...................... 360/78 |
| 4,835,632 A | 5/1989 | Shih et al. ................ 360/78.04 |
| 4,839,876 A | 6/1989 | Fennema et al. .............. 369/32 |
| 4,894,599 A | 1/1990 | Ottesen et al. .............. 318/636 |
| 5,132,855 A | 7/1992 | Waugh et al. ........... 360/78.07 |
| 5,189,571 A | 2/1993 | Murphy et al. ................ 360/75 |
| 5,195,067 A | 3/1993 | Yanagi .......................... 369/32 |
| 5,305,158 A | 4/1994 | Ueda et al. .................... 360/75 |
| 5,550,685 A | * | 8/1996 | Drouin .................... 360/77.08 |
| 5,680,272 A | 10/1997 | Kadlec et al. ........... 360/78.04 |
| 5,859,742 A | 1/1999 | Takaishi ................... 360/78.01 |
| 5,880,953 A | * | 3/1999 | Takeuchi et al. ............. 364/150 |
| 6,122,125 A | 9/2000 | Clare et al. |

FOREIGN PATENT DOCUMENTS

| | | |
|---|---|---|
| EP | 0554125 B1 | 7/1997 |
| GB | 2344421 A | 6/2000 |
| JP | 08126370 A | 5/1996 |

\* cited by examiner

*Primary Examiner*—David Hudspeth
*Assistant Examiner*—Mitchell Slavitt
(74) *Attorney, Agent, or Firm*—David K. Lucente; Derek J. Berger

(57) ABSTRACT

A method of handling multiple resonance frequencies in a disc drive includes monitoring a position error signal (PES) for an actuator arm, generating a plurality of feedforward compensation signals from the PES using a plurality of bandpass filters, and applying the compensation signals to a servo control signal. Each filter has a center frequency that is set to a problematic resonance frequency. The method may also include identifying the problematic frequencies by, for example, commanding a movement of the actuator arm, collecting data points for the PES that are associated with the movement, and performing a digital fourier transform of the data points to identify resonant frequencies. Other methods of identifying problematic frequencies include analyzing PES zero-crossing data, or using principal component analysis.

24 Claims, 18 Drawing Sheets

| Configuration | 1st Access time (ms) | 2nd Access time (ms) | 3rd Access time (ms) | 4th Access time (ms) |
|---|---|---|---|---|
| Without compensation, K=0 | 17.6 | 17.6 | 17.4 | 17.5 |
| With the devised compensation scheme, K=1 | 11.4 | 11.3 | 11.2 | 11.3 |
| With the devised compensation scheme, K=2 | 9.0 | 9.0 | 8.9 | 9.1 |

METHOD AND APPARATUS FOR HANDLING MULTIPLE RESONANCE FREQUENCIES IN DISC DRIVES USING ACTIVE DAMPING

RELATED APPLICATION

This application claims the benefit of U.S. Provisional Application Ser. No. 60/211,552, filed on Jun. 14, 2000 under 35 U.S.C. § 119(e).

FIELD OF THE INVENTION

The present invention relates to the field of mass storage devices. More particularly, this invention relates to a method and apparatus for handling multiple resonance frequencies in disc drives using active damping.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so the data can be successfully retrieved from and written to the disc surface. A microprocessor controls most of the operations of the disc drive as well as passing the data back to the requesting computer and accepting data from a requesting computer for storing to the disc.

The transducer head is typically placed on a small ceramic block, referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the transducer head away from the disc. At the same time, the air rushing past the cavity or depression in the ABS produces a negative pressure area. The negative pressure or suction counteracts the pressure produced at the rails. The slider is also attached to a load spring which produces a force on the slider that is directed toward the disc surface. The various forces equilibrate so that the slider flies over the surface of the disc at a particular desired fly height. The fly height is the distance between the disc surface and the transducing head, which is typically equal to the thickness of the air lubrication film. This film eliminates the friction and the resulting wear that would occur if the transducing head and the disc were to be in mechanical contact during the disc rotation. In some disc drives, the slider passes through a layer of lubricant rather than flying over the surface of the disc.

Information representative of data is stored on the surface of the storage disc. Disc drive systems read and write information stored on tracks on the storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto the track by writing information representative of data onto the storage disc. Similarly, reading data from a storage disc is accomplished by positioning the read/write head above a target track and reading the stored material on the storage disc. To write on or read from different tracks, the read/write head is moved radially across the tracks to a selected target track. The data is divided or grouped together on the tracks. Some disc drives have a multiplicity of concentric circular tracks. In other disc drives, a continuous spiral is one track on one side of drive. Servo feedback information is used to accurately locate the transducer head. The actuator assembly is moved to the required position and held very accurately during read or write operations using the servo information.

The actuator is rotatably attached to a shaft via a bearing cartridge which generally includes one or more sets of ball bearings. The shaft is attached to the base of the disc drive, and may also be attached to the top cover of the disc drive. A yoke is attached to the actuator. A voice coil is attached to the yoke at one end of the rotary actuator. The voice coil is part of a voice coil motor (VCM) used to rotate the actuator and the attached transducer(s). A permanent magnet is attached to the base and the cover of the disc drive. The VCM which drives the rotary actuator comprises the voice coil and the permanent magnet. The voice coil is attached to the rotary actuator and the permanent magnet is fixed on the base. The yoke is generally used to attach the permanent magnet to the base and to direct the flux of the permanent magnet. Since the voice coil sandwiched between the magnet and the yoke assembly is subjected to magnetic fields, electricity can be applied to the voice coil to drive the voice coil so as to position the transducer(s) at a target track.

Two of the ever constant goals of disc drive designers are to increase the data storage capacity of disc drives, and to decrease the amount of time needed to access the data. To increase storage capacity, current disc drives have increased numbers of tracks per inch (TPI). Put simply, current disc drives squeeze more tracks onto the same size disc. Decreasing the amount of time needed to access the data can be thought of as increasing the speed at which data is retrieved. Increasing the speed at which data is retrieved is very desirable. Any decreases in access time increase the speed at which a computer can perform operations on data. When a computer system is commanded to perform an operation on data that must be retrieved from disc, the time needed to retrieve the data from the disc is often the bottleneck in the operation. When data is accessed from a disc more quickly, more transactions can generally be handled by the computer in a particular unit of time.

A rotating disc data storage device uses a servo system to perform two basic operations: track seeking and track following. Track seeking refers to the ability of the disc drive and the servo system to move the read/write transducer head of the disc drive from an initial track to a target track from which data is to be read, or to which data is to be written. The settling of the transducer head at the target track is referred to as seek settling. Track following, which is performed after the head has been aligned with a target track, refers to the ability of the disc drive and the servo system to maintain the read/write head positioned over the target track. Note that, to effectively perform track seeking and track following in a disc drive with increased TPI, the servo open loop bandwidth of the system must also be pushed or increased.

Structural resonance in disc drives is one of the major challenges faced by disc drive designers in general, and disc drive servo control designers in particular. The structural resonance, such as arm bending mode resonance and coil bending mode resonance, will introduce problems in the operation of a disc drive's VCM during seek settling and even during track following. Due to structural resonance, the position error signal (PES) for the actuator arm of a disc drive will oscillate during seek settling and track following, thus adversely affecting the settling time and the drive performance of the disc drive. The effects of structural resonance are getting worse with yearly increases in the number of TPI and in the servo bandwidth of the disc drives. As the number of TPI increases, the tracks become thinner and therefore it becomes crucial for the disc drives to minimize or eliminate resonance which can cause the actuator arm to swing to off-track positions when the actuator resonates during seek settling or track following. As the servo bandwidth increases, the susceptibility of the actuator to vibrations induced at the actuator's resonant frequency increases, which may result in greater off-track disturbances of the heads.

While a certain amount of resonance is acceptable, the acceptable amount of resonance decreases as the number of TPI, and the servo bandwidth, increase. If the resonance is reduced or eliminated, the number of missed revolutions of the disc will be minimized and the access times will decrease. Reducing resonance will also help improve a disc drive's through-put performance. If resonances in the actuator arm at frequencies associated with normal operation of the disc drive are reduced or eliminated, seek settling and track following will also be improved since the servo system will not be attempting to counter the effects of a resonating arm swinging across a desired track from an off-track position on one side to an off-track position on the other side of the desired track during the track settling or track following.

A common approach for addressing the structural resonance problem is to include an analog or digital notch filter to attenuate the resonant modes at particular frequencies. The control signal from the servo controller is passed through the notch filter before driving the VCM. Unfortunately, due to the nature of notch filters, the notch-filter approach introduces a large phase lag around the notch center frequency. Thus, while this approach is often used in disc drives when the resonance frequency is high compared to the servo bandwidth, the notch-filter approach is not applicable for handling resonance frequencies in disc drives that are near the servo open loop gain crossover frequency since the notch filter would cause an unacceptable phase margin drop. For example, the resonance frequencies of the arm bending mode and the coil bending mode resonance are about 700 Hz and 1000 Hz, respectively, which are both near the servo open loop gain crossover frequency. Thus, these structural resonance modes can cause problems in the track seeking and following operations which are not adequately addressed by the notch-filter approach. The seek settling and track following problems are worse if these frequencies coincide. Therefore, the notch-filter approach alone is not useful or adequate for handling certain resonance modes.

Therefore, what is needed is an improved method and apparatus for handling resonance effects in disc drives. There is also a need for a method and apparatus for handling resonance effects in disc drives which improves seek settling and/or track following in the disc drives, and may be used with disc drives that have increased numbers of TPI and increased servo bandwidths. There is also a need for a method and apparatus for handling structural resonance effects in disc drives that have resonance frequencies at or near the servo open loop gain crossover frequency of the disc drives. There is also a need for a method and apparatus for handling both high and low resonance frequencies in disc drives without substantial performance losses.

In practice, some disc drives experience problematic resonance effects at multiple resonance frequencies during seek settling and even during track following. These resonance frequencies may often appear after a short seek. One or more of these resonance frequencies may be high compared to the servo bandwidth of the disc drive, while another one or more of these resonance frequencies may be at or near the servo bandwidth. For example, a disc drive may experience a first resonant frequency of about 700 Hz during seek settling due to coil bending mode resonance, and may also experience a second resonant frequency of about 1000 Hz during seek settling due to the arm bending mode resonance. Both of these resonant frequencies are typically at or near the servo open loop gain crossover frequency of the disc drive. Thus, the use of multiple notch filters to handle these multiple resonance frequencies will not be applicable. Therefore, there is also a need for a method and an apparatus for effectively handling multiple resonance frequencies in disc drives.

SUMMARY OF THE INVENTION

The present invention relates to a method and apparatus which use active damping for handling multiple resonance frequencies in disc drives. This active damping approach advantageously handles resonance effects which occur at high and/or low frequencies without adverse affect on the performance of the disc drives. For example, this active damping approach can handle multiple resonant frequencies including at least one resonant frequency existing at or near the servo open loop gain crossover frequency of the disc drives. Thus, for example, the arm bending mode resonance and the coil bending mode resonance can both be effectively handled. Other combinations of multiple resonant frequencies can also be efficiently handled.

In accordance with one embodiment of the invention, a method of handling multiple resonance frequencies in a disc drive includes the steps of monitoring a position error signal for an actuator arm of a disc drive, generating a plurality of feedforward compensation signals from the position error signal using a plurality of bandpass filters, and applying the compensation signals to a servo control signal. Each filter has a center frequency that is set to a problematic resonance frequency.

In accordance with another embodiment of the invention, a method of handling multiple resonance frequencies in a disc drive includes steps of monitoring a position error signal for an actuator arm of a disc drive, generating a plurality of feedforward compensation signals from the position error signal using a plurality of bandpass filters, and applying the compensation signals to a servo control signal. Each filter has a center frequency set to a problematic resonance frequency, and the method also includes identifying the problematic resonance frequencies of the drive.

In one embodiment, identifying the problematic resonance frequencies of the disc drive includes the steps of commanding a movement of the actuator arm of the disc drive, collecting data points for the position error signal for the arm that are associated with the movement, and performing a digital fourier transform (DFT) of the collected position error signal data points to identify actual resonant frequencies.

In another embodiment, identifying the problematic resonance frequencies of the disc drive includes the steps of commanding a movement of the actuator arm, collecting zero-crossings data for the position error signal that are associated with the movement, and analyzing that data to identify actual resonant frequencies.

In another embodiment, identifying the problematic resonance frequencies of the disc drive includes the steps of defining a resonance frequency list including a plurality of possible problematic resonance frequencies that may appear during operation, and performing a principal components analysis to identify problematic resonance frequencies included in the resonance frequency list that actually appear.

In another embodiment, identifying the problematic resonance frequencies of the disc drive includes the steps of defining a resonance frequency list including a plurality of possible problematic resonance frequencies that may appear during operation and, for each possible problematic resonance frequency in the list, measuring a first settling time without compensation for the resonance frequency, measuring a second settling time with compensation for the resonance frequency, taking the difference between the first and second settling times, and determining if the resonance frequency is non-problematic by comparing the magnitude of the difference between the two settling times to a threshold value. The identifying also includes performing a principal components analysis of the possible problematic resonance frequencies that remain after determining the non-problematic resonance frequencies to identify the problematic resonance frequencies that actually appear.

In another embodiment, identifying the problematic resonance frequencies of the disc drive includes the steps of defining a resonance frequency list including a plurality of possible problematic resonance frequencies that may appear during operation, commanding a booster to boost the servo control signal at one of the possible problematic resonance frequencies in the list to generate a boosted control signal which is provided to an assembly for actuating the arm, and monitoring the position error signal to determine if the frequency at which the servo control signal was boosted by the booster is problematic.

In accordance with another embodiment of the invention, an apparatus for handling multiple resonance frequencies in a disc drive includes means for monitoring a position error signal for an actuator arm of the disc drive, means for generating a plurality of feedforward compensation signals from the position error signal using a plurality of bandpass filters, each of the bandpass filters having a center frequency that is set to a problematic resonance frequency, means for applying the plurality of feedforward compensation signals to a servo control signal, and means for identifying the problematic resonance frequencies of the disc drive.

These and various other features as well as advantages which characterize the present invention will be apparent to a person of ordinary skill in the art upon reading the following detailed description and reviewing the associated drawings.

BRIEF DESCRIPTION OF THE DRAWINGS

FIG. 11 is a chart showing measured write settling access times for the disc drive control loop shown in FIG. 6, with gain K set to different values (i.e., 0, 1, 2);

DESCRIPTION OF THE PREFERRED EMBODIMENTS

Figure 1:
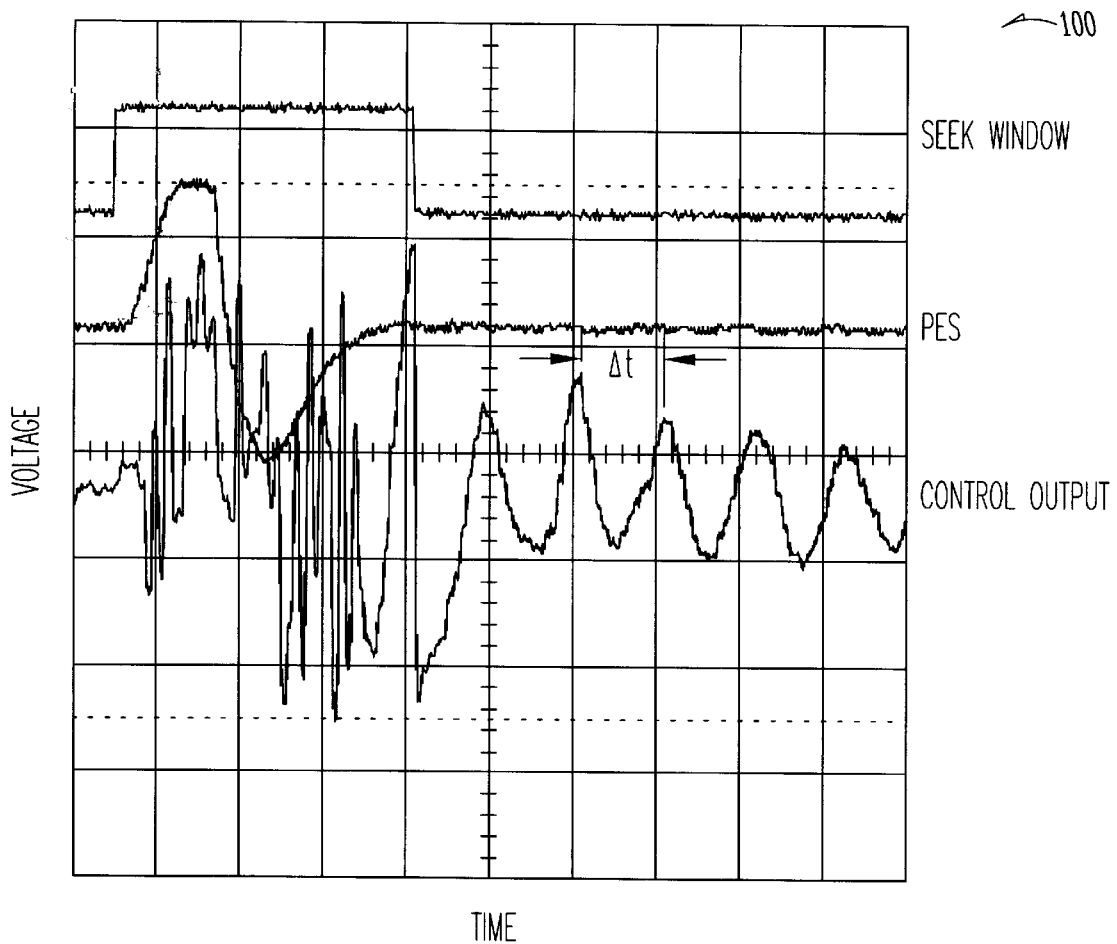
FIG. 1 is a graph illustrating the oscillation of the position error signal (PES) during seek settling on a conventional disc drive.

In the following detailed description of the preferred embodiments, reference is made to the accompanying drawings which form a part hereof, and in which are shown by way of illustration specific embodiments in which the invention may be practiced. It is to be understood that other embodiments may be utilized and that structural changes may be made without departing from the scope of the invention.

In this application, a method and apparatus for handling multiple resonance frequencies in disc drives using active damping are described. For multiple known resonance frequencies that may appear during seek settling (e.g., after a short seek), or even during track following, the multiple active damping feedforward technique of the present system monitors a position error signal (PES) for the actuator arm of a disc drive, generates multiple feedforward compensation signals from the position error signal using multiple bandpass filters, and applies the multiple feedforward compensation signals to a servo control signal for the voice coil motor (VCM) (e.g., by subtracting the compensation signals from the VCM control signal). This technique effectively handles multiple resonance frequencies that may appear during seek settling and/or track following without sacrificing the disc drive performance.

In the following description, the active damping technique of the present system is first described as being used to effectively handle the arm bending mode resonance of a disc drive. Then, the active damping technique of the present system is more generally described as being used to handle multiple resonance frequencies. As will be shown below, this technique can be generalized to handle any number of problematic resonance modes which may adversely affect the operation of a disc drive, subject only to practical constraints such as limitations in processing power.

The arm bending resonance mode has a resonance frequency of about 1000 Hz (more specifically, about 930 Hz for an exemplary disc drive). Since this resonance frequency is near the servo open loop gain crossover frequency of the disc drive, the conventional notch-filter approach for handling resonance is inapplicable. It should be understood, however, that the active damping technique of the present system can also be used to handle other resonance modes, including other resonance modes having high or low resonance frequencies with respect to the servo open loop gain crossover frequency of the disc drive. For example, this technique can handle the coil bending mode resonance of a disc drive, which has a resonance frequency of about 700 Hz. Before describing the active damping technique of the present system in more detail, the characteristics of the arm bending mode resonance are described.

The arm bending mode resonance has the characteristic of zone-dependence, which is due to several factors. First, magnet flux across the coil will no longer form straight lines around the two ends of the magnet. The situation will be worse if only a single magnet is used. Second, skew angle will be different at different zones. For example, at inner diameter (ID), skew angle will be about 0 degrees. Therefore, the actuator arm will be tangential to the track, and resonant bending motion along the arm will have no or only a small component across the track. At outer diameter (OD), skew angle will not be zero. Thus, the resonant bending motion along the arm will have a component across the track. As for middle diameter (MD), since the magnet flux across the coil will be straight, less bending mode resonance will occur.

The arm bending mode resonance will cause oscillation of the position error signal (PES) during seek settling. This resonant mode will be excited during seek operations, especially during short seeks in which the VCM is accelerated and then decelerated rapidly as the transducing head is moved from an initial to a target track. Therefore, the position error signal will exhibit oscillation during seek settling, thus resulting in a longer settling time. The oscillation of the position error signal during a typical seek operation on a conventional disc drive is shown by graph 100 in FIG. 1. The top trace in FIG. 1 represents the seek window, the middle trace represents the position error signal, and the bottom trace represents the control signal driving the VCM. The oscillatory frequency of the position error signal is about 930 Hz (i.e., the arm bending mode resonance frequency). The oscillation in the position error signal causes the control signal to oscillate with a period $\Delta t$, wherein $1/\Delta t = 930$ Hz. As can be seen, the oscillations cause the seek settling time to be relatively long.

Figure 2:
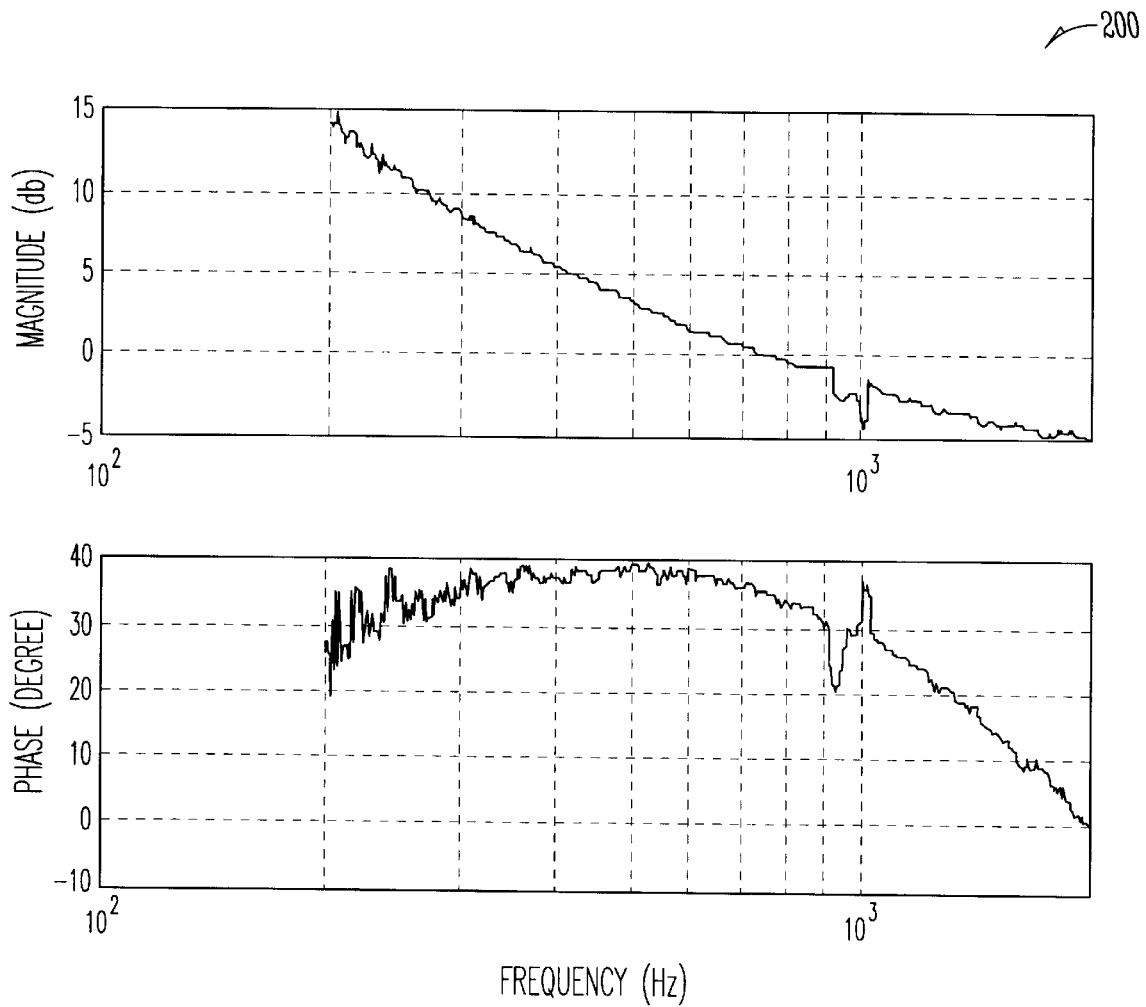
FIG. 2 is an open loop bode plot illustrating the effect of arm bending mode resonance on gain and phase for the conventional disc drive.
Figure 3:
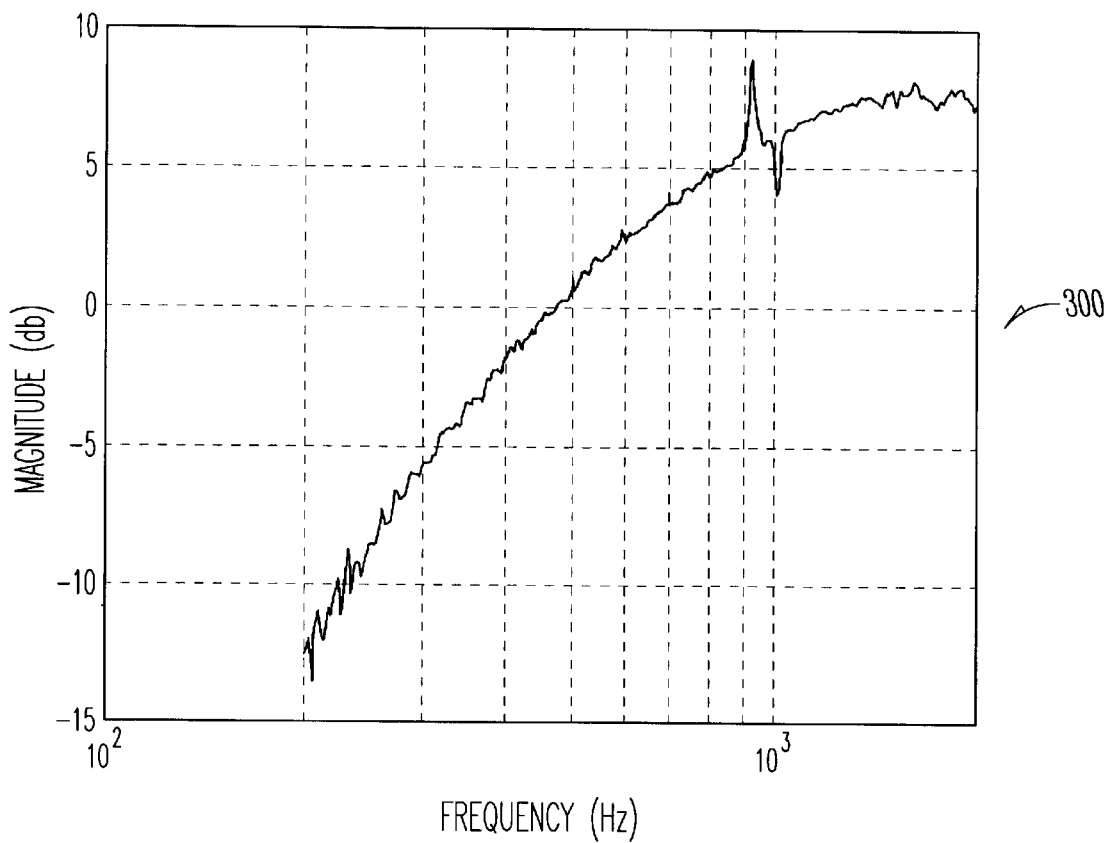
FIG. 3 is a sensitivity function plot illustrating the arm bending resonance mode at a particular resonance frequency for the conventional disc drive.

Referring to FIG. 2, the effect of arm bending mode resonance on gain and phase for the conventional disc drive is shown by the open loop bode plot 200. The characteristics of this particular resonance mode include introducing a phase loss at the resonance frequency (see the drop in phase at about 930 Hz in the lower graph). Referring to FIG. 3, the sensitivity function plot 300 shows the resonance mode at about 930 Hz, which coincides with the PES oscillatory frequency shown in FIG. 1.

Thus, the position error signal (PES) has the characteristic of having a 930 Hz oscillation. The position error signal results from relative motion of the actuator arm with respect to the track to be followed. Note that, for writing data to the track, or reading data from the track, the actuator arm needs to follow the track. Thus, if the position error signal oscillation is caused by resonant motion of the actuator arm itself, the resonance needs to be rejected. As discussed above, the commonly-used method for rejecting resonance is to include a notch filter having a center frequency that matches the resonance frequency. However, the nature of the notch filter itself limits the application of the notch-filter approach to handling resonance frequencies that are high in relation to the servo open loop bandwidth, because the notch filter will introduce unacceptable phase loss at lower frequencies. For resonance modes having resonance frequencies at or near the servo open loop bandwidth, such as the arm or coil bending mode resonance, the notch-filter approach is not applicable. For example, since the 930 Hz resonance frequency of the arm bending mode resonance is near the servo open loop bandwidth, using a notch filter to handle the resonance effect of the arm bending mode resonance will unacceptably reduce phase margin.

In one conventional disc drive, arm bending mode resonance is handled in a "passive" manner using a self-adaptive seeking profile. In this passive scheme, the whole surface of the disc is partitioned into several zones. At each zone, short seeks are executed, and the settling time of the seeks is checked. If the settling time for a zone is too long, the seeking profile for the zone is lowered down (i.e., made slower) by a certain percentage and a re-test of the settling time for the zone is performed. A compensation count is maintained to indicate the number of times that the seeking profile is lowered down, and the count is then used for subsequent seeks to insure that the settling time is adequately fast. This passive scheme works reasonably well since the PES oscillation during seek settling is due to the excitation during seeking. However, this self-adaptive seeking profile scheme sacrifices the seeking time for a better settling time which may, in turn, provide the benefit of a faster access time.

In contrast, the present invention handles resonance effects in disc drives in an "active" manner without sacrificing seeking time. The present invention can be used with all mechanical configurations of disc drives having either rotary or linear actuation. Also, the present invention is useful in all types of disc drives including hard disc drives, zip disc drives, floppy disc drives and any other type of disc drives. Thus, while the discussion below focuses on one particular type of disc drive, it should be understood that the present invention is not limited to this particular type.

Figure 4:
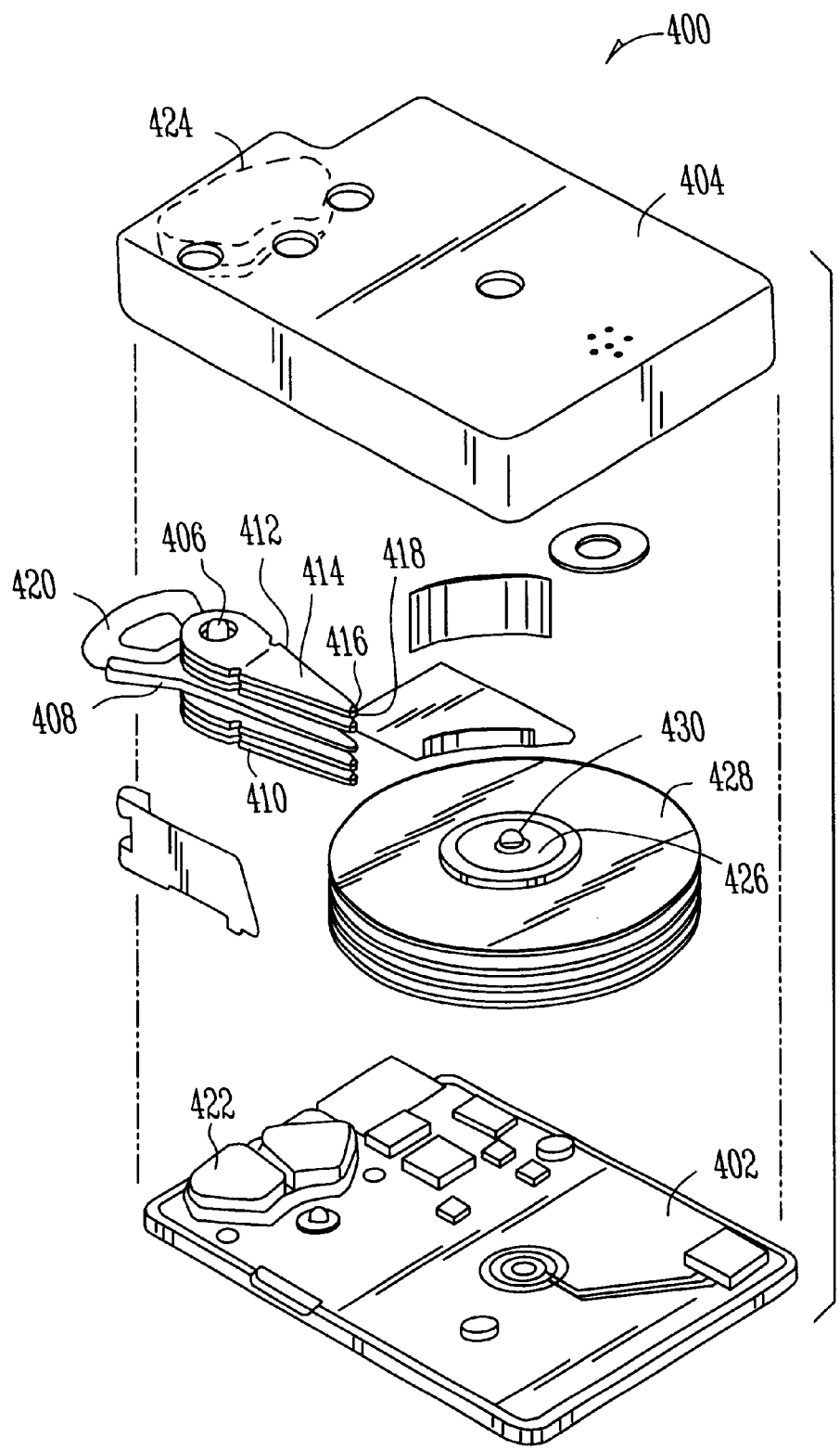
FIG. 4 is an exploded view of a disc drive with a multiple disc stack in accordance with one embodiment of the present invention.

Referring now to FIG. 4, a disc drive 400 having a rotary actuator includes a housing having a base 402 and a cover 404 which form a disc enclosure. Rotatably attached to base 402 on an actuator shaft 406 is a rotary actuator assembly 408. Rotary actuator assembly 408 includes a comb-like structure 410 having a plurality of arms 412. Attached to separate arms 412 on comb 410 are load beams or load springs 414. Load beams or load springs 414 are also referred to as suspensions. Attached at the end of each load spring 414 is a slider 416 which carries a magnetic transducer 418. Slider 416 and transducer 418 form what is often referred to as the head. It should be noted that many sliders have one transducer 418 and that is what is shown in the figures. It should also be noted that the present system is equally applicable to sliders having more than one transducer, such as what is referred to as a magneto-resistive (MR) head in which one transducer is generally used for reading and another transducer is generally used for writing. On the end of rotary actuator assembly 408 opposite load springs 414 and sliders 416 is a voice coil 420.

Attached within the disc enclosure between base 402 and cover 404 is a first magnet 422 and a second magnet 424. As shown, first and second magnets 422 and 424 are associated with base 402 and cover 404, respectively. First magnet 422, second magnet 424 and voice coil 420 are the key components of a voice coil motor (VCM) that applies a force to actuator assembly 408 to rotate actuator assembly 408 about actuator shaft 406. Also mounted to base 402 is a spindle motor. The spindle motor includes a rotating portion called a spindle hub 426. In this particular disc drive, the spindle motor is located within spindle hub 426. In FIG. 4, a number of discs 428 are shown as attached to spindle hub 426. In other disc drives, a single disc or a different number of discs from that shown in FIG. 4 may be attached to the hub. The system described herein applies equally to disc drives having a plurality of discs and disc drives having a single disc, and is also equally applicable to disc drives with spindle motors which are within hub 426 or under hub 426. Discs 428 are rotatably attached to base 402 through a shaft 430 (and by hub 426). Actuator assembly 408 carries transducer 418 in a transducing relation with respect to one of discs 428 for reading and writing data to that disc 428 during operation of drive 400.

Figure 5:
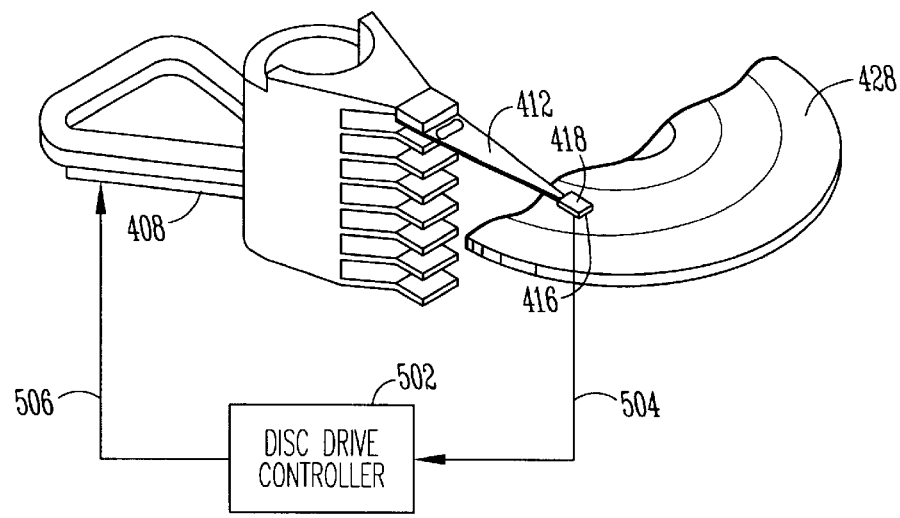
FIG. 5 is a schematic representation of a servo control system of the disc drive shown in FIG. 4.

FIG. 5 is a schematic representation of a servo control system 500 for disc drive 400 which includes a disc drive controller 502. Controller 502 is coupled to transducer 418 to receive input signals 504 representing positions of transducer 418. Controller 502 is also coupled to actuator assembly 408 to provide signals to control the rotation of assembly 408, thereby also controlling the position of transducer 418. Thus, system 500 provides closed-loop control over the position of transducer 418. By providing appropriate control signals 506 to actuator assembly 408, controller 502 performs both track seeking and track following functions. In the track seeking function, the read/write head including transducer 418 is moved from an initial track on disc 428 into radial alignment with a target track on disc 428 from which data is to be read or to which data is to be written. In the track following function, which is performed when the head reaches a selected track, the read/write head is maintained in radial alignment with the selected track defined on disc 428 as disc 428 rotates, so that transducer 418 can read data from, or write data to, the selected track. As noted above, the track settling and even the track following functions may be subject to adverse effects due to structural resonances in disc drive 400 that can cause arms 412 to resonate when actuator assembly 408 is moved. However, by providing active damping as described below, such resonances can be reduced or eliminated.

Figure 6:
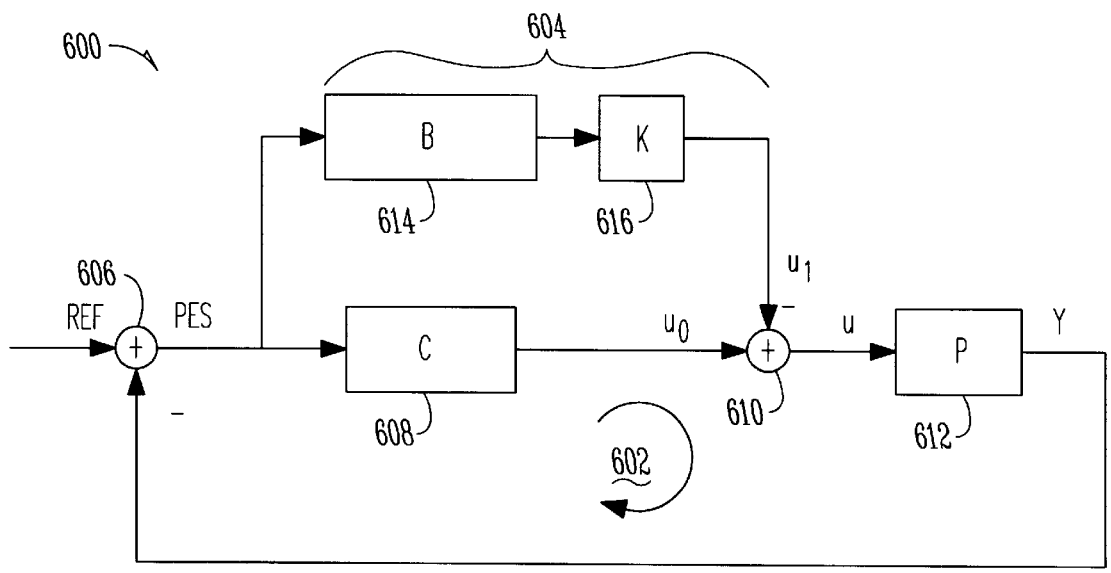
FIG. 6 is a schematic representation of a disc drive control loop which uses active damping to handle position error signal (PES) oscillation during seek settling.

Referring to FIG. 6, disc drive controller 502 executes a disc drive control loop 600 which uses active damping for handling resonance effects such as the PES oscillation that occurs during seek settling. Disc drive control loop 600 includes a servo control loop 602 as well as a feedforward compensation path 604. The active damping technique can be configured to handle resonance effects that occur during other types of movements of actuator assembly 408, such as during track following.

Servo control loop 602 includes a first difference element 606, a servo controller 608, a second difference element 610, and a power amplifier and plant 612 for driving actuator assembly 408. First difference element 606 subtracts a sensed position signal (Y) from a reference position signal (REF) to generate the position error signal (PES) for actuator arm 412. In one embodiment, the sensed position signal (Y) is determined using signals received from transducer 418. Servo controller 608 monitors the position error signal (PES) and generates a servo control signal ($U_0$) from the PES by performing conventional computations. Difference element 610 combines a feedforward compensation signal ($U_1$) from compensation path 604 with the servo control signal ($U_0$) from servo controller 608 to generate a control signal (U), which is applied to plant 612 with control effort $U=U_0-U_1$. In this embodiment, difference element 610 subtracts the feedforward compensation signal ($U_1$) from the servo control signal ($U_0$) to generate the control signal (U).

Feedforward compensation path 604 includes a bandpass filter 614, a gain element 616, and the second difference element 610. Bandpass filter 614 provides bandpass filtering of the position error signal (PES) and gain element 616 multiplies the output from bandpass filter 614 by a constant gain K to generate the feedforward compensation signal ($U_1$), which is subtracted from the servo control signal ($U_0$) by second difference element 610. Bandpass filter 614 has a center frequency which is set to the resonance frequency of the resonance mode of interest. For example, to handle arm bending mode resonance, the center frequency is set to about 1000 Hz, and more specifically to about 930 Hz for a particular disc drive. To handle coil bending mode resonance, the center frequency would be set to about 700 Hz. The center frequency would be set to other frequencies to handle other resonance modes. The closed-loop transfer function for disc drive control loop 600 is as follows:

$$\frac{Y}{REF} = \frac{(PC - PBK)}{(1 + PC - PBK)} \quad (1)$$

Figure 7:
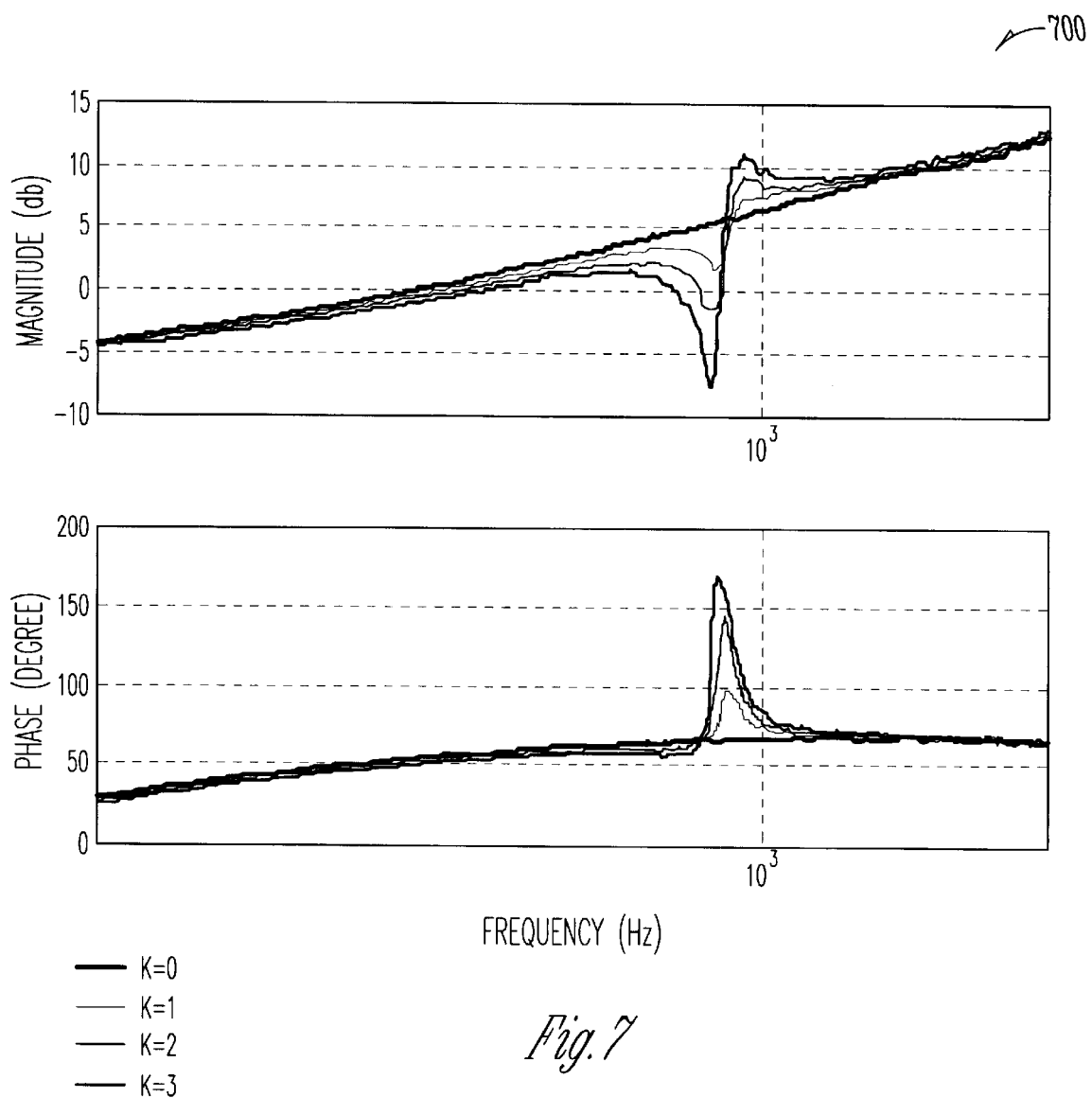
FIG. 7 are graphs illustrating the frequency response of the disc drive control loop shown in FIG. 6, which illustrates the effect of different values of gain K.

Gain K can be adjusted to achieve different performance. The frequency response $$\left( \frac{U}{PES} = \frac{(U_0 - U_1)}{PES} \right)$$

of the combined controller (servo control loop 602 and feedforward compensation path 604) is shown by graphs 700 in FIG. 7 for different values of gain K. Note that gain K=0 is equivalent to disabling the active damping, which can be verified by noting that the compensation signal ($U_1$) in FIG. 6 will be 0 if K=0. Also note that, if K has a non-zero value, the combined controller provides a phase advance around the center frequency of bandpass filter 614 (930 Hz), which compensates for the phase loss introduced at that frequency that was shown in FIG. 2. Thus, by setting gain K equal to a non-zero value, disc drive control loop 600 can compensate for the resonance effects caused by the arm bending mode resonance. By using other center frequencies for bandpass filter 614, disc drive control loop 600 can compensate for the resonance effects caused by other resonance modes.

Figure 8:
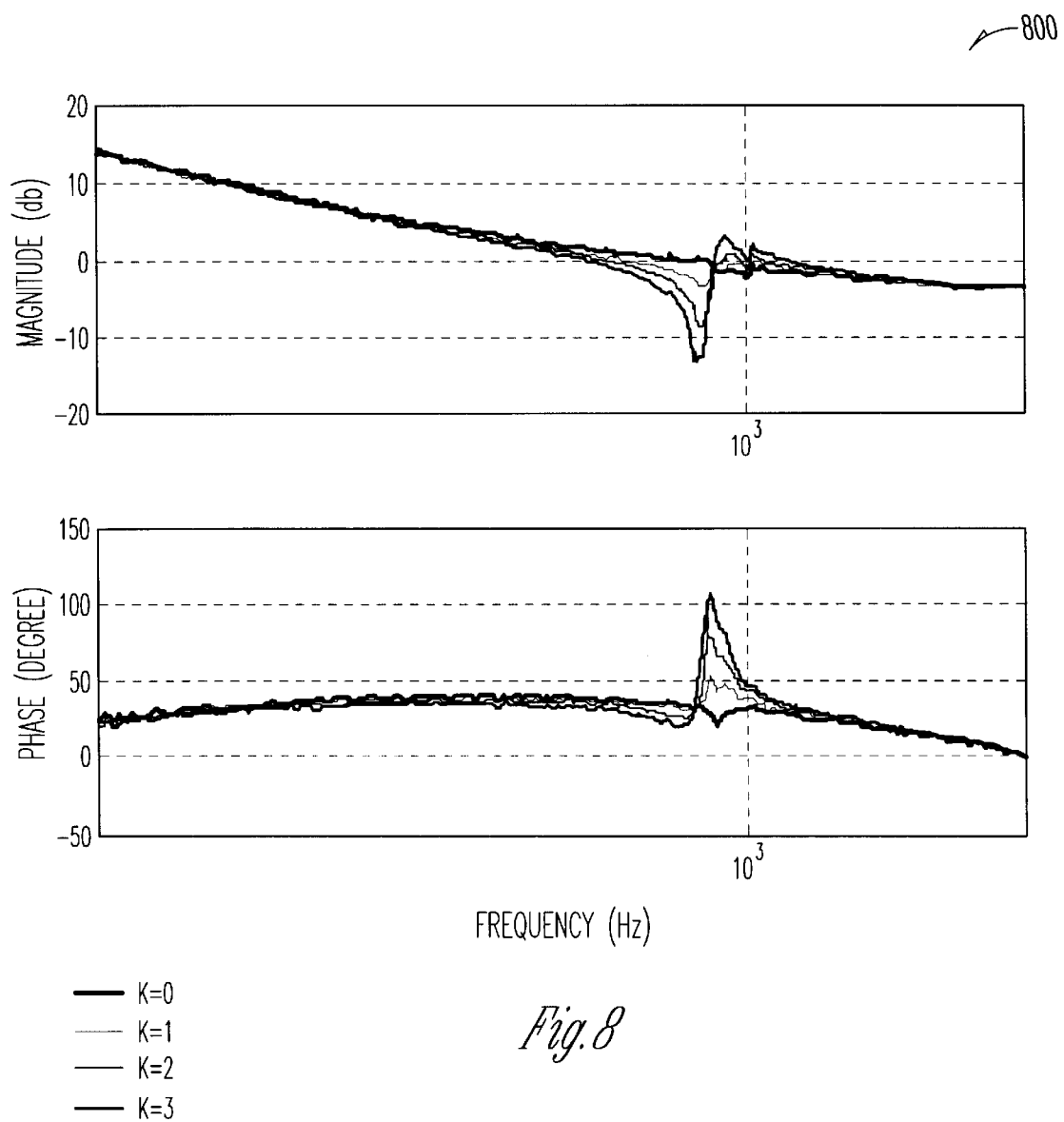
FIG. 8 is an open loop bode plot for the disc drive control loop shown in FIG. 6, which illustrates the effect of different values of gain K on gain and phase.
Figure 9:
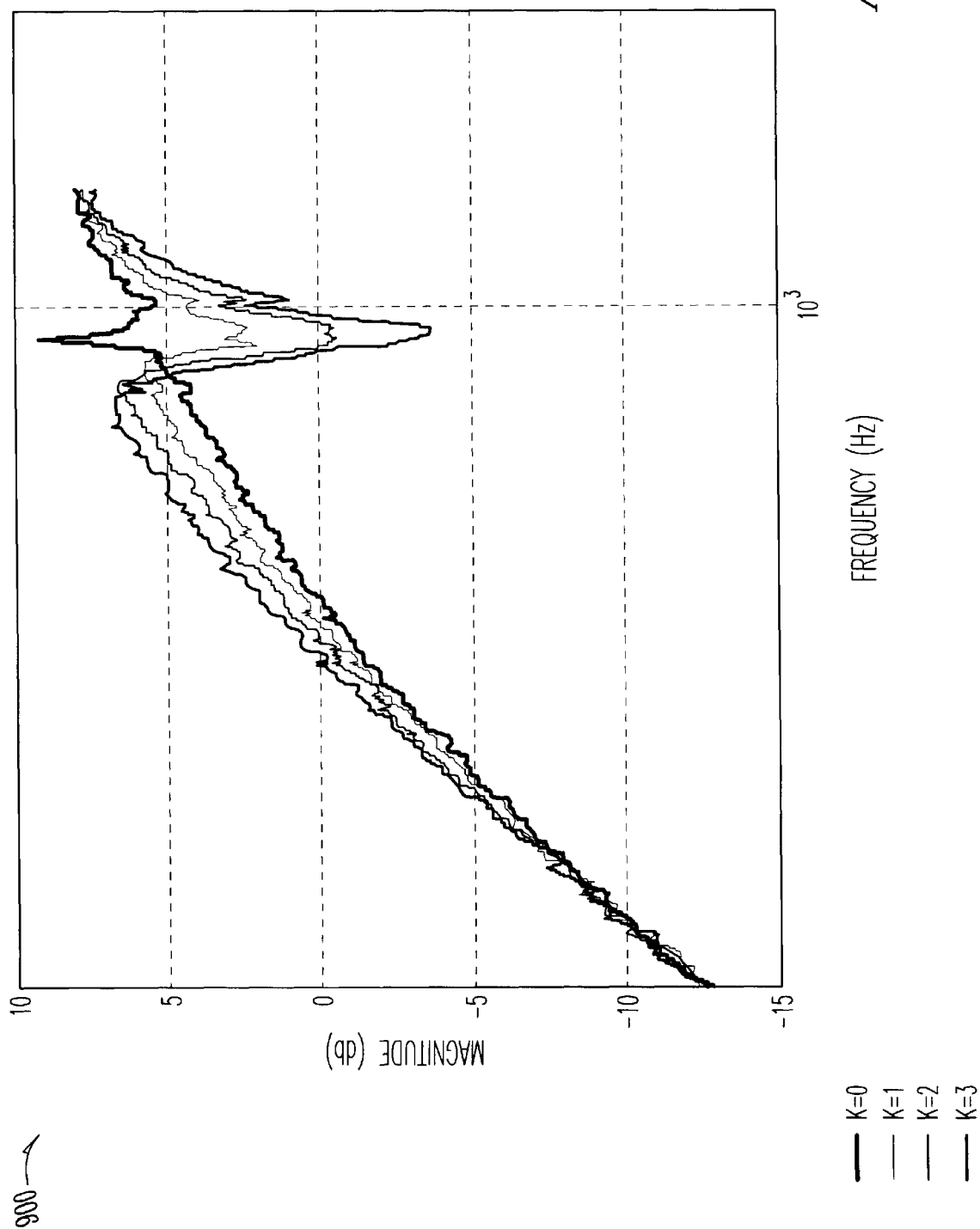
FIG. 9 is a sensitivity function plot for the disc drive control loop shown in FIG. 6, which illustrates the effect of different values of gain K on sensitivity.

The open loop bode plot 800 for different values of gain K are shown in FIG. 8, and sensitivity function plots 900 for these values of gain K are shown in FIG. 9. From FIGS. 8 and 9, it can be seen that the active damping that is provided by disc drive control loop 600 when gain K is non-zero will damp down the arm bending mode resonance. However, a "waterbed" effect can still be clearly observed.

To eliminate the waterbed effect, an optimal value of gain K is selected. If gain K is set to its optimal value, the oscillation or motion caused by the resonance mode will be removed from the VCM control signal 506. In other words, referring to FIG. 6 and equation (1), the value of PC–PBK (i.e., the numerator of equation (1)) will be equal to 0 at the arm bending mode resonance frequency of about 930 Hz when K is optimal. Since the gain of bandpass filter 614 at the center frequency of 930 Hz is equal to 1, the value of gain K is set to the same value as the gain of servo controller 608 at 930 Hz (i.e., K equals C at 930 Hz). The frequency response of servo controller 608 is shown in FIG. 7. It can be seen from this graph that, when K=0 (i.e., when feedforward compensation path 604 is effectively disabled), the magnitude of the gain at 930 Hz is about 6 dB (i.e., about 2). Thus, gain element 616 is configured to provide a constant gain K of about 6 dB (about 2) at 930 Hz.

In one embodiment, gain element 616 provides a constant gain K of about 6 dB over a broad frequency range, including the resonance frequency of about 930 Hz. In another embodiment, gain element 616 provides a constant gain K of about 6 dB within a range of frequencies passing through bandpass filter 614, and provides one or more other gains K at other frequencies which, when multiplied by the output of bandpass filter 614, is low enough not to affect control signal U. For example, if the output from bandpass filter 614 is at a very low level for a frequency outside of the band of frequencies passing filter 614, then the gain K provided by element 616 at that frequency can vary substantially without adverse affect on control signal (U).

Figure 10:
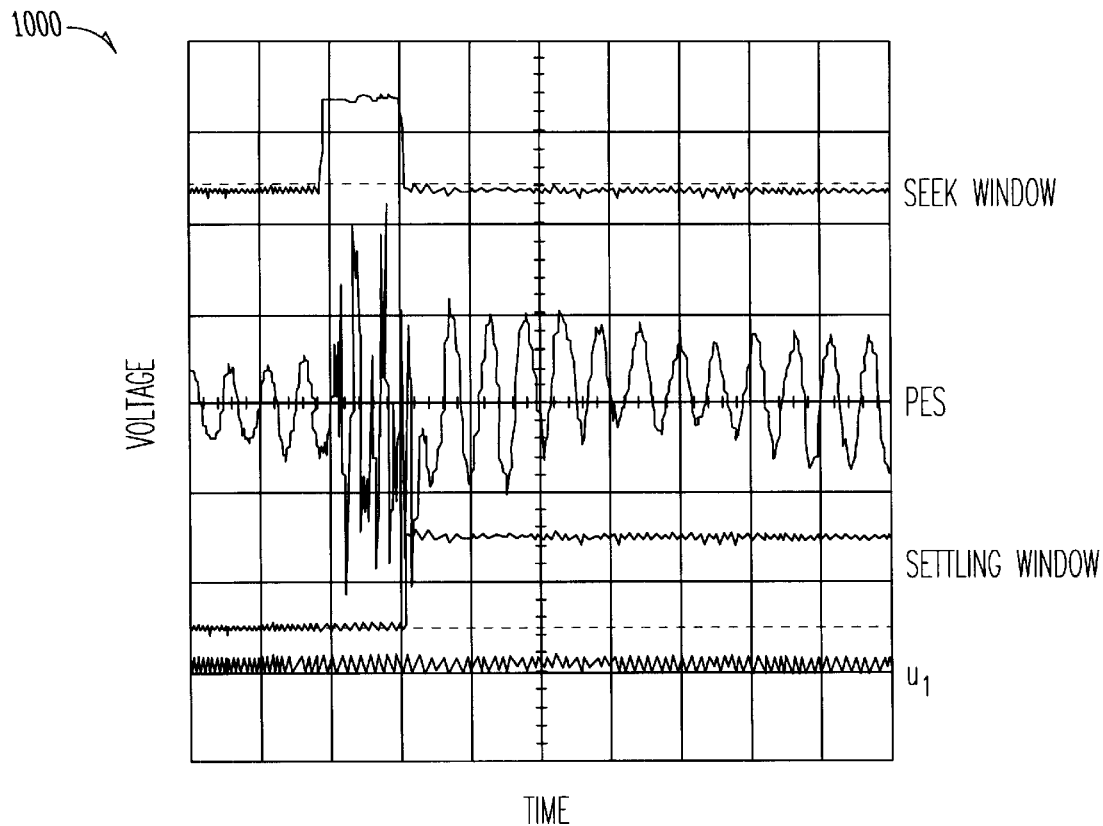
FIG. 10 are graphs comparing the position error signal during seek settling for the disc drive control loop of FIG. 6, with gain K set to 0 (top) and 2 (bottom)
Figure 10:
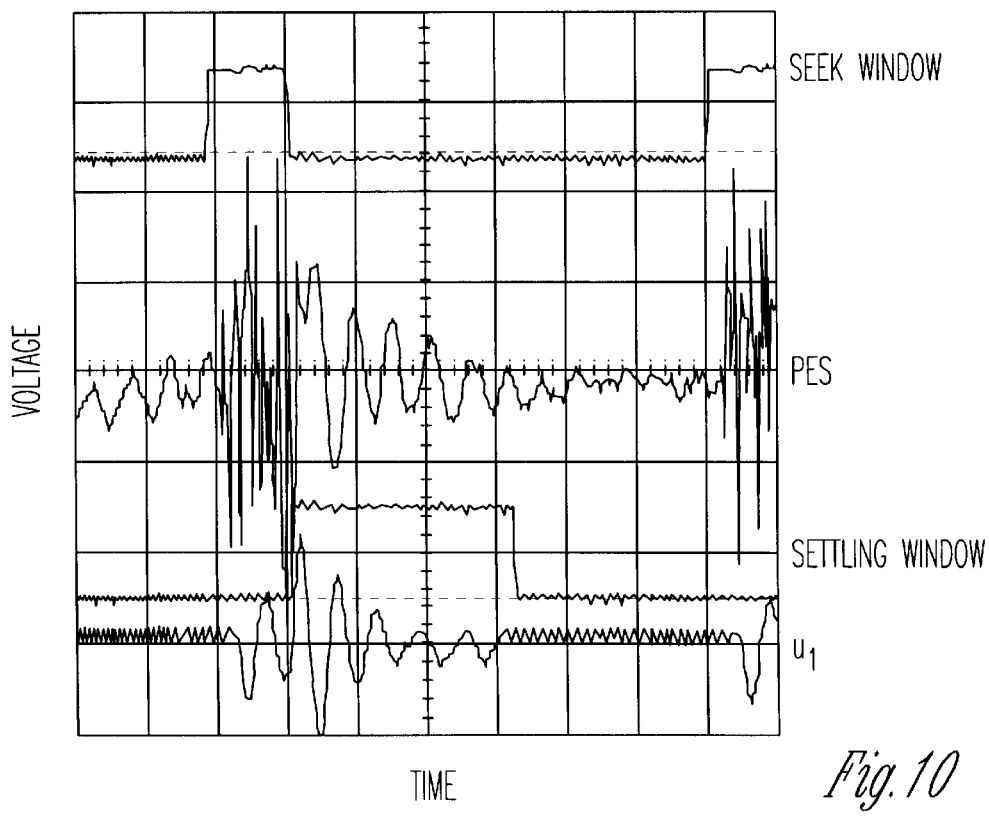

The top and bottom graphs 1000 shown in FIG. 10 provide a comparison of the position error signal (PES) during seek settling for disc drive 400, with gain K set to 0 (top) and 2 (bottom). Since gain K=0 is equivalent to disabling the active damping scheme, FIG. 10 effectively compares the position error signal (PES) both with and without the active damping scheme. From top to bottom, the four traces in each of the graphs represent the seek window, the position error signal (PES), the settling window, and the feedforward compensation signal ($U_1$). The feedforward compensation signal ($U_1$) for the top graph remains at 0 (i.e., active damping is disabled) while the same signal ($U_1$) for the bottom graph provides compensation. By comparing the graphs, it can be seen that the oscillation of the position error signal (PES) is quickly damped down with K=2 in comparison to K=0, and that the settling time is reduced dramatically. In fact, the bottom graph shows the start of a second seeking cycle, while the top graph has not yet ended its settling window.

The chart 1100 of FIG. 11 shows measured write settling access times for disc drive 400, with the gain K being set to different values (i.e., 0, 1 and 2). The measurements were performed at a known resonant zone, and the write settling access time was measured for a short seek with a certain seek length. For each configuration (each value of K), four measurements were performed for consistency. It can be seen that, with gain K=0 (i.e., with active damping effectively disabled), the average write settling access time was about 17.5 msec. With gain K=1, the average write settling access time was decreased to about 11.3 msec. Finally, with gain K=2, the average write settling access time was further decreased to about 9.0 msec. While these results suggest that gain K should be set equal to 2 to minimize the write settling access time, in accordance with the analysis set forth above, it will be apparent to a person of skill in the art that other values of K may be used. These other values may be determined as the result of theoretical analysis or of testing.

Figure 12:
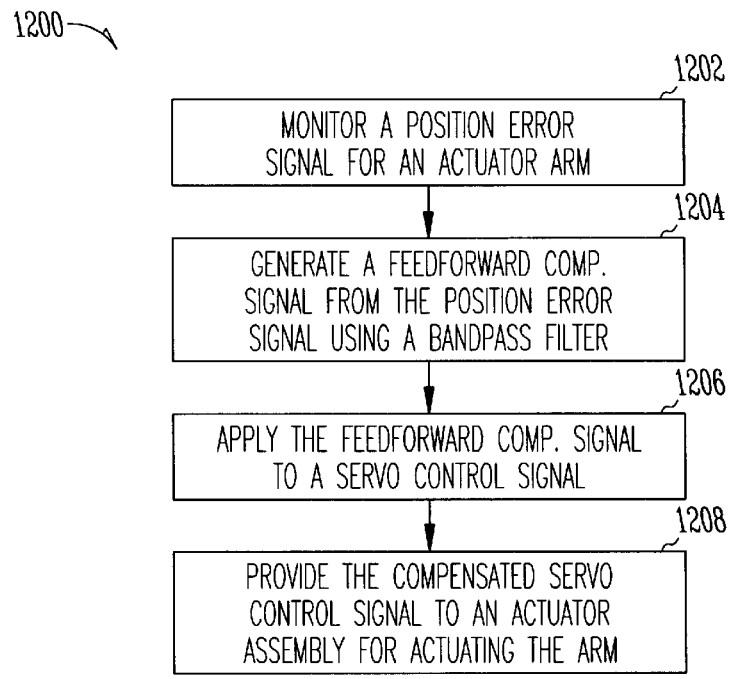
FIG. 12 is flow diagram showing a process for handling resonance effects in a disc drive using active damping according to an embodiment of the invention.

Referring to FIG. 12, a process 1200 for handling resonance effects in a disc drive using active damping according to one embodiment of the present invention includes the steps of monitoring a position error signal (PES) for an actuator arm (step 1202), generating a feedforward compensation signal from the position error signal (PES) using a bandpass filter (step 1204), applying the compensation signal to a servo control signal (step 1206), and providing the compensated servo control signal to an actuator assembly for actuating the actuator arm (step 1208). Process 1200 may also include the step of setting the center frequency of the bandpass filter to a known or predetermined resonance frequency of a particular resonance mode.

Advantageously, the inventive method and apparatus disclosed herein use active damping for handling resonance effects in disc drives. This active damping approach can effectively handle resonance effects which occur at either high or low frequencies without adversely affecting the access times for the disc drives, and can handle structural resonance frequencies that may exist at or near the servo open loop bandwidth of the disc drives, including both arm and coil bending mode resonances.

The active damping technique illustrated in FIG. 6 is effective for handling a single, known resonance frequency that appears during seek settling. However, in practice, a disc drive may experience multiple resonance frequencies during seek settling, and even during track following. Thus, as is described below, this active damping technique can be extended to handle multiple resonance frequencies which can adversely affect disc drive performance during seek settling and track following.

Figure 13:
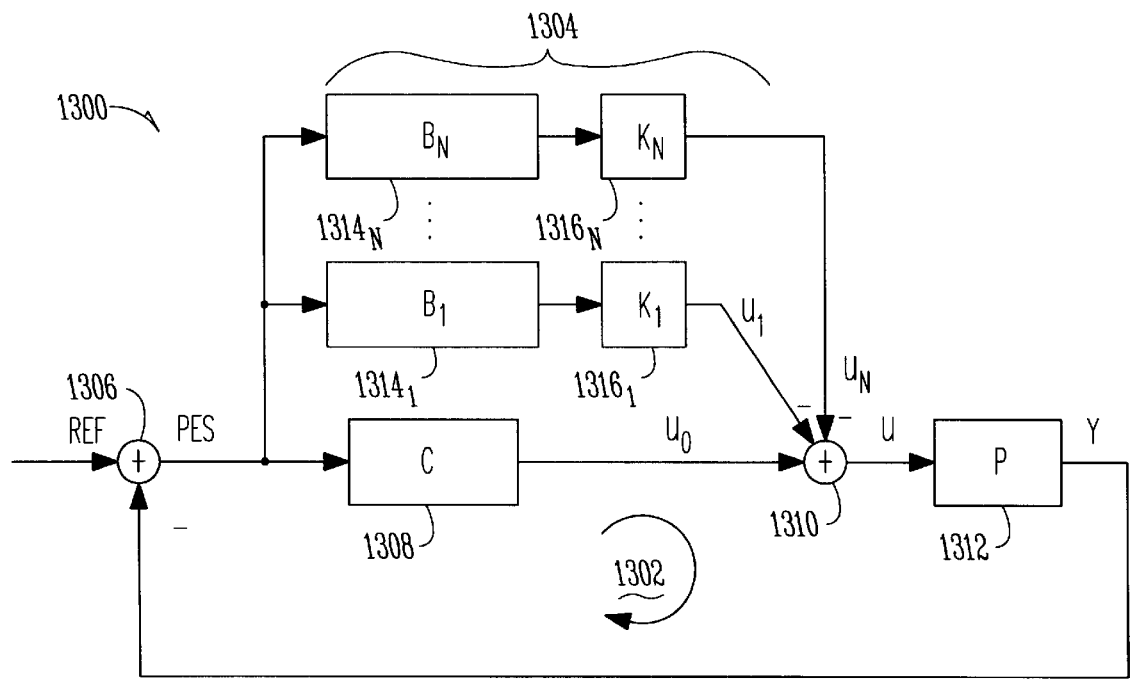
FIG. 13 is a schematic representation of a disc drive control loop according to another embodiment of the present invention, wherein the control loop uses active damping to handle multiple resonance frequencies that appear during seek settling.

Referring to FIG. 13, in accordance with another embodiment of the present invention, disc drive controller 502 executes a disc drive control loop 1300 that uses active damping to handle multiple resonance frequencies that may appear during the operation of disc drive 400. Control loop 1300 includes a servo control loop 1302 and multiple feedforward compensation paths collectively referred to by numeral 1304. This technique can handle resonance effects that occur during seek settling and/or other types of movements of actuator assembly 408, such as track following.

Servo control loop 1302 includes a first difference element 1306, a servo controller 1308, a second difference element 1310, and a power amplifier and plant 1312 for driving actuator assembly 408. First difference element 1306 subtracts a sensed position signal (Y) from a reference position signal (REF) to generate the position error signal (PES) for actuator arm 412. In one embodiment, the sensed position signal (Y) is determined using sensed signals received from transducer 418. Servo controller 1308 monitors the position error signal (PES) and generates servo control signal ($U_0$) from the PES by performing conventional computations. Second difference element 1310 combines multiple feedforward compensation signals ($U_1 \ldots U_N$) from multiple feedforward compensation paths 1304 with servo control signal ($U_0$) from servo controller 1308 to generate a control signal (U), which is applied to plant 1312 with control effort $$u = u_0 - \sum_{j=1}^{N} u_j.$$

In this embodiment, difference element 1310 subtracts each of the multiple feedforward compensation signals ($U_1 \ldots U_N$) from the servo control signal ($U_0$) to generate the control signal (U).

Each of feedforward compensation paths 1304 includes a bandpass filter $1314_j$ and a gain element $1316_j$, where j=1, 2, ..., N. For each path 1304, bandpass filter $1314_j$ provides bandpass filtering of the position error signal (PES), and gain element $1316_j$ multiplies the output from its respective filter $1314_j$ by a constant gain $K_j$ to generate the feedforward compensation signal ($U_j$) for that path. Feedforward compensation signals ($U_j$, j=1, 2, ..., N) are subtracted from servo control signal ($U_0$) by second difference element 1310. The N possible problematic resonance frequencies may be mechanically referred to as $Z_1, Z_2, \ldots, Z_N$. For each $Z_j$ (j=1, 2, ..., N), one of bandpass filters $1314_j$ has a center frequency set to the resonant frequency $Z_j$, and the gain of the corresponding gain element $1316_j$ is a constant $K_j$. For example, to handle arm bending mode resonance, the center frequency of one of the bandpass filters is set to about 1000 Hz, and more specifically to about 930 Hz. To simultaneously handle the coil bending mode resonance, the center frequency of another bandpass filter is set to about 700 Hz. The center frequencies of the other bandpass filters are set to the resonance frequencies of other possible problematic resonance modes. The closed-loop transfer function for loop 1300 is as follows:

$$\frac{y}{r} = \frac{PC - P\sum_{j=1}^{N} B_j K_j}{1 + PC - P\sum_{j=1}^{N} B_j K_j} \quad (2)$$

Thus, for each path 1304, gain $K_j$ can be adjusted to achieve different performance.

Therefore, note that equation (1) is a special case of equation (2), with N=1. Similarly, FIG. 6 is a special case of FIG. 13, with N=1. Since each bandpass filter $1314_j$ extracts the signal of one of the possible problematic resonant frequencies $Z_1, Z_2, \ldots, Z_N$ that may appear during seek settling (or track following), it is desirable to completely eliminate this frequency component from the VCM control signal. Based on this consideration, the constant gains $K_j$ in equation (2) are set as follows:

$$K_j = |C(jZ_j)| \quad (3)$$

Since $Z_j$ (j=1, 2, ..., N) and the gain of servo controller 1308 at each $Z_j$ are known a priori, the optimal values of gains $K_j$ can be determined. In one embodiment, these gains $K_j$ are predetermined, and are stored in a table within disc drive controller 502.

In one embodiment, all N bandpass filters $1314_1, \ldots, 1314_N$ are executed in parallel in real time. That is, each of the possible problematic resonant frequencies $Z_1, Z_2, \ldots, Z_N$ that may appear during operation of disc drive 400 (e.g., during seek settling or track following) are handled simultaneously. This embodiment is used if disc drive 400 has processing resources (e.g., CPU, memory, etc.) that are powerful enough to simultaneously handle all N possible problematic resonant frequencies.

In other embodiments, such as where the processing resources of disc drive 400 are not powerful enough to simultaneously execute all N bandpass filters, less than all N bandpass filters are executed in parallel in real time. For example, in a low-cost desktop disc drive product, the processing power needed to simultaneously execute all N bandpass filters $1314_j$ may be prohibitive, especially when N is large (e.g., 16 or 32). Thus, only a portion of the N bandpass filters $1314_j$ (i.e., less than N) are turned on to handle the resonant frequencies with the most significant effects. The remaining bandpass filters are turned off to conserve the processing resources.

To effectively apply the multiple active damping technique in a disc drive 400 with insufficient processing resources to simultaneously execute all N bandpass filters, two questions are answered. First, since not all of the known resonance frequencies will appear in the seek settling for a specific zone, what major resonance frequencies will actually appear in the seek settling for each zone? Second, how can the trouble-making resonance frequencies that actually appear during seek settling be effectively distinguished with minimal processing resources (with less code space and/or CPU cost)? Once these questions are answered, the resonant frequencies can be effectively handled by turning on only some of the bandpass filters at each zone to handle those resonance frequencies having the most significant effects. Note that, while this discussion focuses on handling resonant effects during seek settling, the implementation presented herein can be readily used to handle resonance effects that may occur during other types of disc drive operation, such as during track following.

Figure 14:
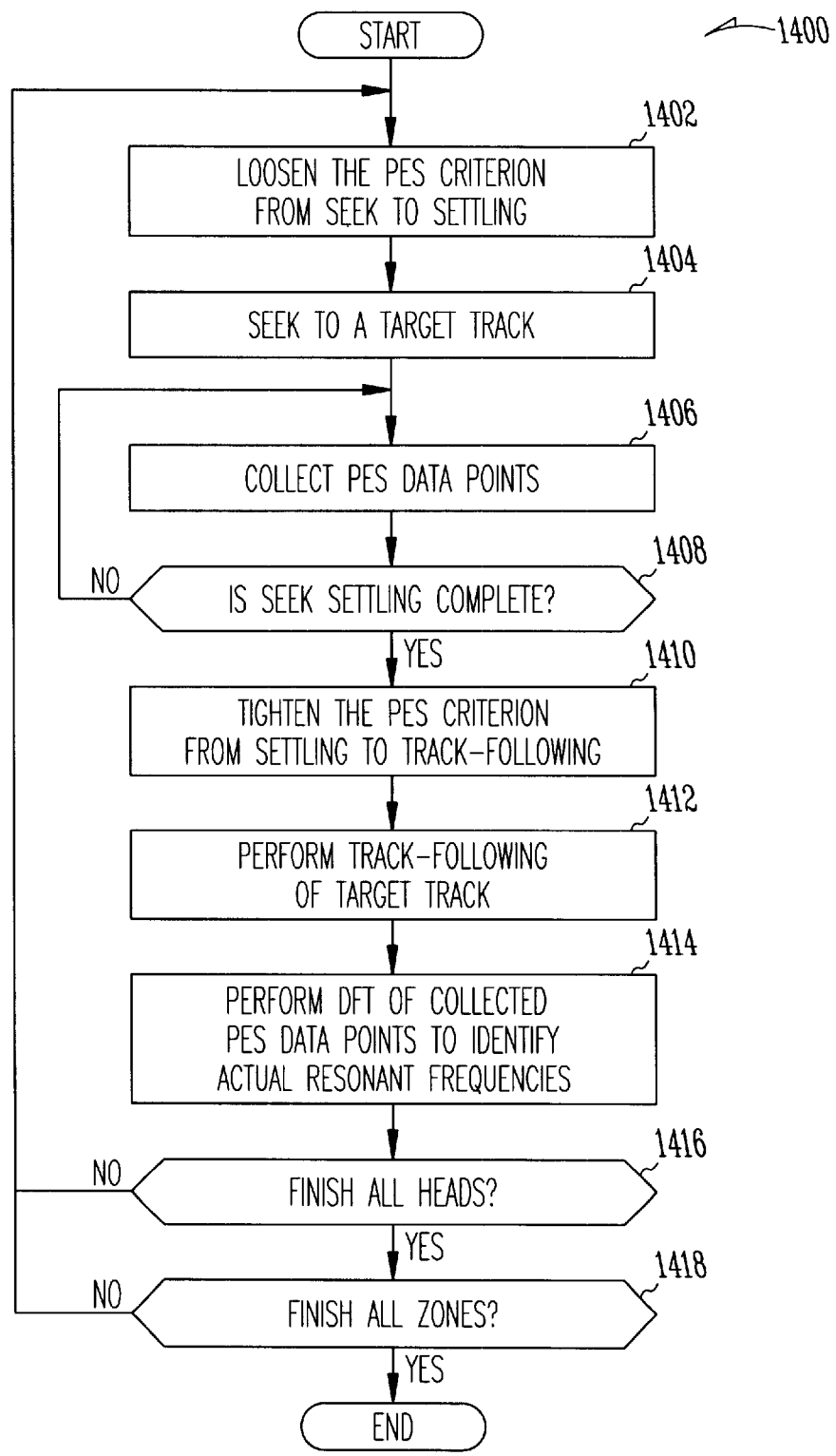
FIG. 14 is a flow diagram illustrating a method for identifying the resonance frequencies that actually appear during the seek settling process in accordance with one embodiment of the present invention.

Referring to FIG. 14, a method 1400 for identifying resonance frequencies that actually appear during seek settling by using digital fourier transform (DFT) in accordance with one embodiment of the invention is shown. Method 1400 may be performed by, for example, the disc drive controller or CPU. At step 1402, the CPU loosens the PES criterion from seek to settling. At step 1404, the CPU commands a seek to a target track. At step 1406, the CPU collects PES data points during the seek settling, and stores the data points in memory. At step 1408, the CPU stops the collection of PES data points at the completion of the seek settling. At step 1410, the CPU tightens the PES criterion from settling to track-following. At step 1412, the CPU performs track-following of the target track. At step 1414, the CPU analyzes the collected PES data points by using DFT to identify the actual resonant frequencies in the PES that appeared during the seek settling. As indicated by steps 1416 and 1418, the procedure of steps 1402–1414 is performed for each head in each zone. At this point, the CPU has determined how many and which of the resonant frequencies actually appeared during the seek settling process for the disc drive 400. Thus, method 1400 identifies resonance frequencies during seek settling by DFT.

Once the resonant frequencies are identified for each zone and for each head, a selected number of bandpass filters $1314_j$ are turned on to provide compensation, with the center frequencies of these filters $1314_j$ set to the resonance frequencies.

During a normal seek settling process, not enough PES data points are likely to be collected to allow the DFT to reliably determine the resonant frequencies. To increase the number of PES data points that are collected during seek settling when the resonance frequencies are being identified, the PES criterion from seek to settling is loosened at step 1402, and then tightened from settling to track-following at step 1410. By loosening the PES criterion from seek to settling, the number of PES data points collected during settling after a short seek is increased such that the frequencies that were excited can be determined by using the DFT technique. In other embodiments where enough PES data points are collected during a normal seek settling process, PES-criterion adjusting steps 1402 and 1410 are not needed.

Figure 15:
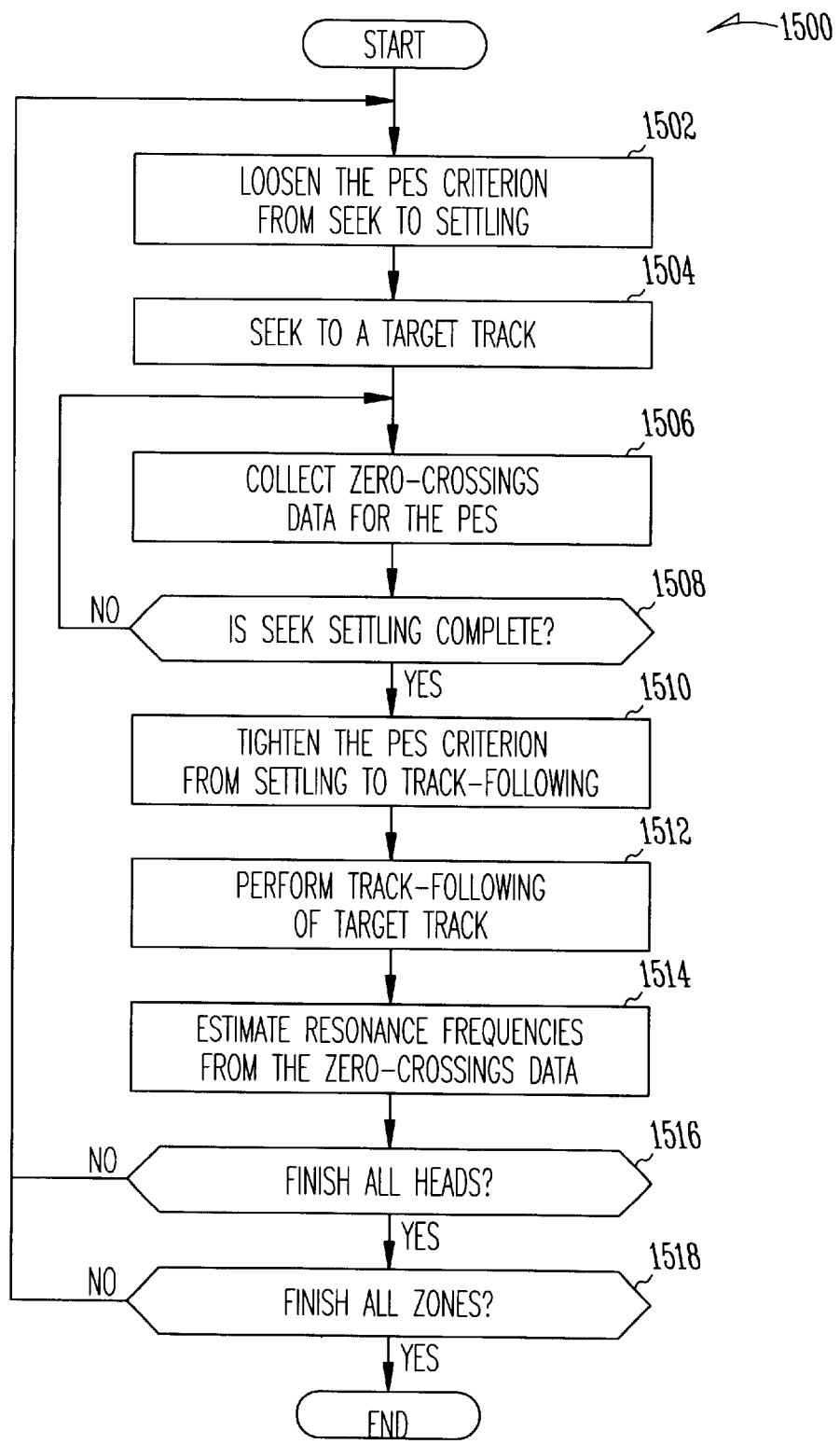
FIG. 15 is a flow diagram illustrating a method for identifying the resonance frequencies that actually appear during the seek settling process in accordance with another embodiment of the present invention.

Referring to FIG. 15, a method 1500 for proximal identification of resonance frequencies that actually appear during seek settling by analyzing zero-crossings of the PES in accordance with another embodiment of the invention is shown. Method 1500 is performed by, for example, the disc drive controller or CPU. At step 1502, the CPU loosens the PES criterion from seek to settling. At step 1504, the CPU commands a seek to a target track. At step 1506, the CPU collects zero-crossings data for the PES during the seek settling, and stores this data in memory. At step 1508, the CPU stops collecting zero-crossings data once the seek settling completes. At step 1510, the CPU tightens the PES criterion from settling to track-following. At step 1512, the CPU performs track-following of the target track. At step 1514, the CPU analyzes the collected zero-crossings data to estimate the actual resonant frequencies in the PES during seek settling. As indicated by steps 1516 and 1518, the procedure of steps 1502–1514 is performed for each head in each zone. At this point, the CPU has determined how many and which resonant frequencies actually appear during the seek settling for disc drive 400. Thus, method 1500 proximally identifies resonance frequencies during seek settling by analyzing zero-crossings.

Once the resonant frequencies are identified for each zone and for each head, a selected number of bandpass filters 1314$_j$ are turned on to provide compensation, with the center frequencies of these filters 1314$_j$ set to the resonance frequencies.

During a normal seek settling process, not enough zero-crossing data may be collected to provide a reliable estimate of the resonant frequencies. To increase the amount of zero-crossings data collected during the seek settling when the resonance frequencies are being identified, the PES criterion from seek to settling is loosened at step 1502, and then tightened from settling to track-following at step 1510. By loosening the PES criterion from seek to settling, the amount of zero-crossings data that is collected during settling after a short seek is increased so that the frequencies that were excited can be more reliably estimated. In other embodiments where enough zero-crossing data is collected during a normal seek settling process, PES-criterion adjusting steps 1502 and 1510 are not needed.

In one embodiment, the zero-crossings of the PES during the seek settling process are counted at step 1506 in order to obtain a rough estimate of the dominant frequency that actually appears during the seek settling (e.g., X crossings/sec). This rough estimate is compared to a set of mechanically-known resonance frequencies that may have been problematic, and the two resonance frequencies adjacent to the rough estimate (i.e., the frequencies just lower and higher than the rough estimate) are determined at step 1514, and are used as the estimated resonance frequencies.

Figure 16:
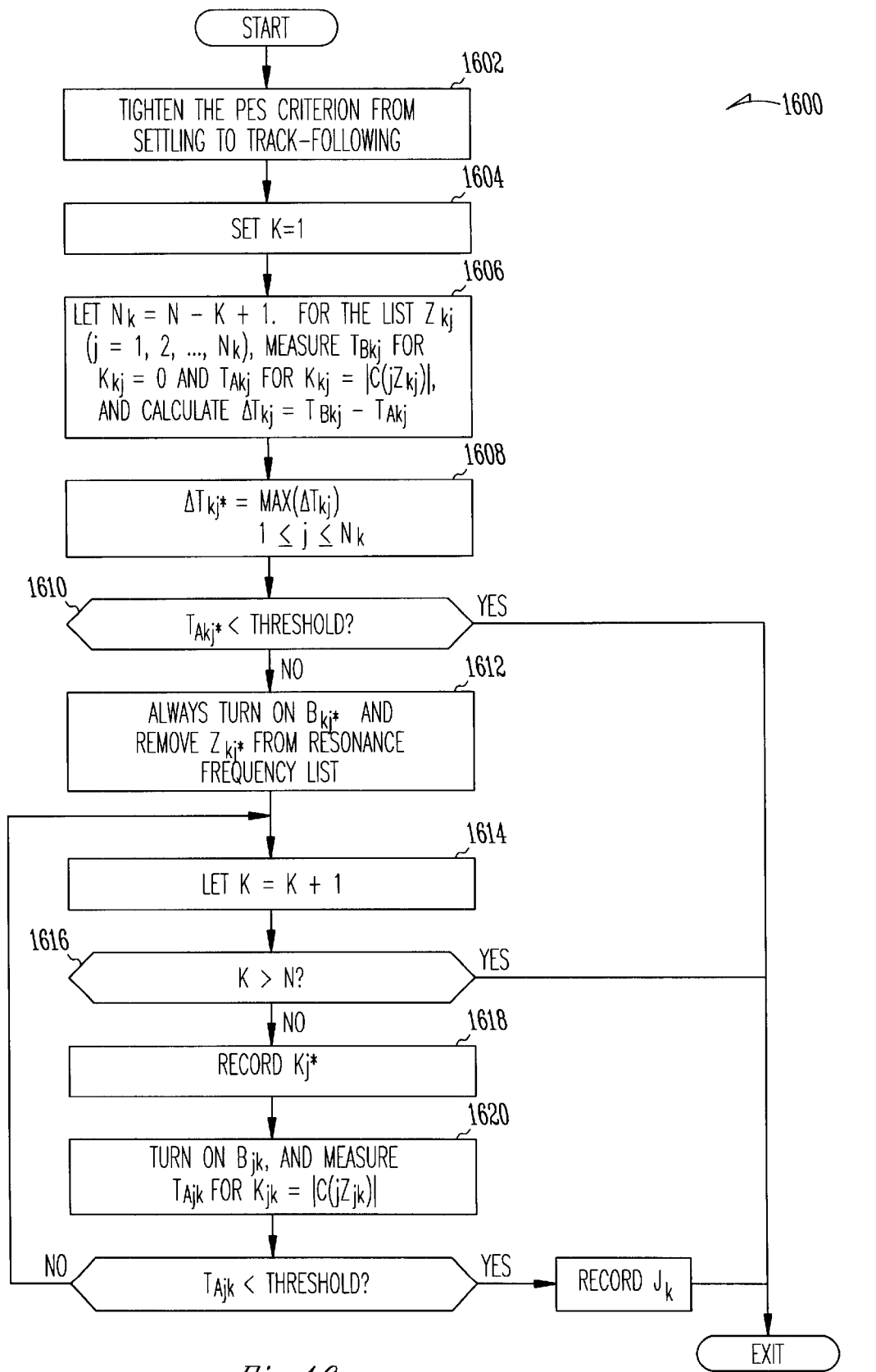
FIG. 16 is a flow diagram illustrating a principal components analysis (PCA) method for identifying the resonance frequencies that actually appear during the seek settling process in accordance with another embodiment of the invention.

Referring to FIG. 16, a principal components analysis (PCA) method 1600 for identifying resonance frequencies that appear during seek settling by measuring slow settling times according to another embodiment of the invention is shown. This PCA method 1600 is repeated for each zone, and for each head. PCA method 1600 is performed by, for example, the disc drive controller or CPU. At step 1602, the CPU tightens the PES criterion from seek settling to track following. Tightening the PES settling criterion at step 1602 will cause a more sensitive correlation between resonance frequency and the settling time. At step 1604, the CPU sets index k=1.

At step 1606, let $N_k$=N−k+1 and, for the resonance frequency list $Z_{kj}$ (j=1, 2, . . . , $N_k$), the CPU measures the slow settling time $T_{Bkj}$ and $T_{Akj}$ for $K_{kj}$=0 and for $K_{kj}$=|C(j$Z_{kj}$)|, respectively, and calculates the difference in the settling times for each frequency $Z_{kj}$ using the formula $\Delta T_{kj}$=$T_{Bkj}$−$T_{Akj}$. The "resonance frequency list" is a list of all possible problematic resonance frequencies known a priori, of which only a portion will actually appear during settling. Thus, the CPU calculates the difference between the settling time with active damping applied (i.e., with $K_{kj}$=|C(j$Z_{kj}$)|) and the settling time without active damping (i.e., with $K_{kj}$=0) for each of the possible problematic resonance frequencies in the resonance frequency list.

At step 1608, the CPU determines the principal frequency component by finding the maximum value $\Delta T_{kj^*}$ (1≦j*≦$N_k$). In other words, the CPU determines the principal frequency component which appears in the PES by using the formula:

$$\Delta T_{kj^*} = \max_{1 \leq j \leq N_k} \Delta T_{kj}^* \qquad (4)$$

At step 1610, the CPU determines if the maximum seek settling time when a single bandpass filter 1314$_{j^*}$ is applied one by one (i.e., when the bandpass filter 1314 for only the principal frequency component is turned on) is less than a given threshold that defines an acceptable settling time (i.e., is $T_{Akj^*}$<Threshold)? If so, then the seek settling time requirement has been met (i.e., the maximum seek settling time is acceptable), and PCA method 1600 exits. If not, at step 1612, the bandpass filter $B_{kj^*}$ for the principal frequency component is turned on always (e.g, by setting $K_{kj^*}$=|C(j$Z_{kj^*}$)|), and the resonance frequency $Z_{kj^*}$ for that principal frequency component is removed from the resonance frequency list. At step 1614, index k is incremented (i.e., k=k+1). At step 1616, the index k is compared to the number N of possible problematic resonance frequencies. If K>N, then PCA method 1600 exits. If K≦N, the CPU records $k_{j^*}$ in memory at step 1618 and goes to step 1620. At step 1620, the CPU turns on the bandpass filter $B_{jk}$, and measures the slow settling time $T_{Ajk}$ for $K_{jk}$=|C(j$Z_{jk}$)|. At step 1622, if the slow settling time $T_{Ajk}$ is less than the given threshold that defines an acceptable seek settling time, $j_k$ is recorded at step 1624, and PCA method 1600 exits. Otherwise, the CPU returns to step 1614 to increment index k. By repeating the loop formed by steps 1614, 1616, 1618, 1620 and 1622, the CPU sequentially turns on the corresponding bandpass filters. The screening process stops when the seek settling time requirement is met, and the frequencies responsible for the satisfactory settling performance are identified and recorded.

Figure 17:
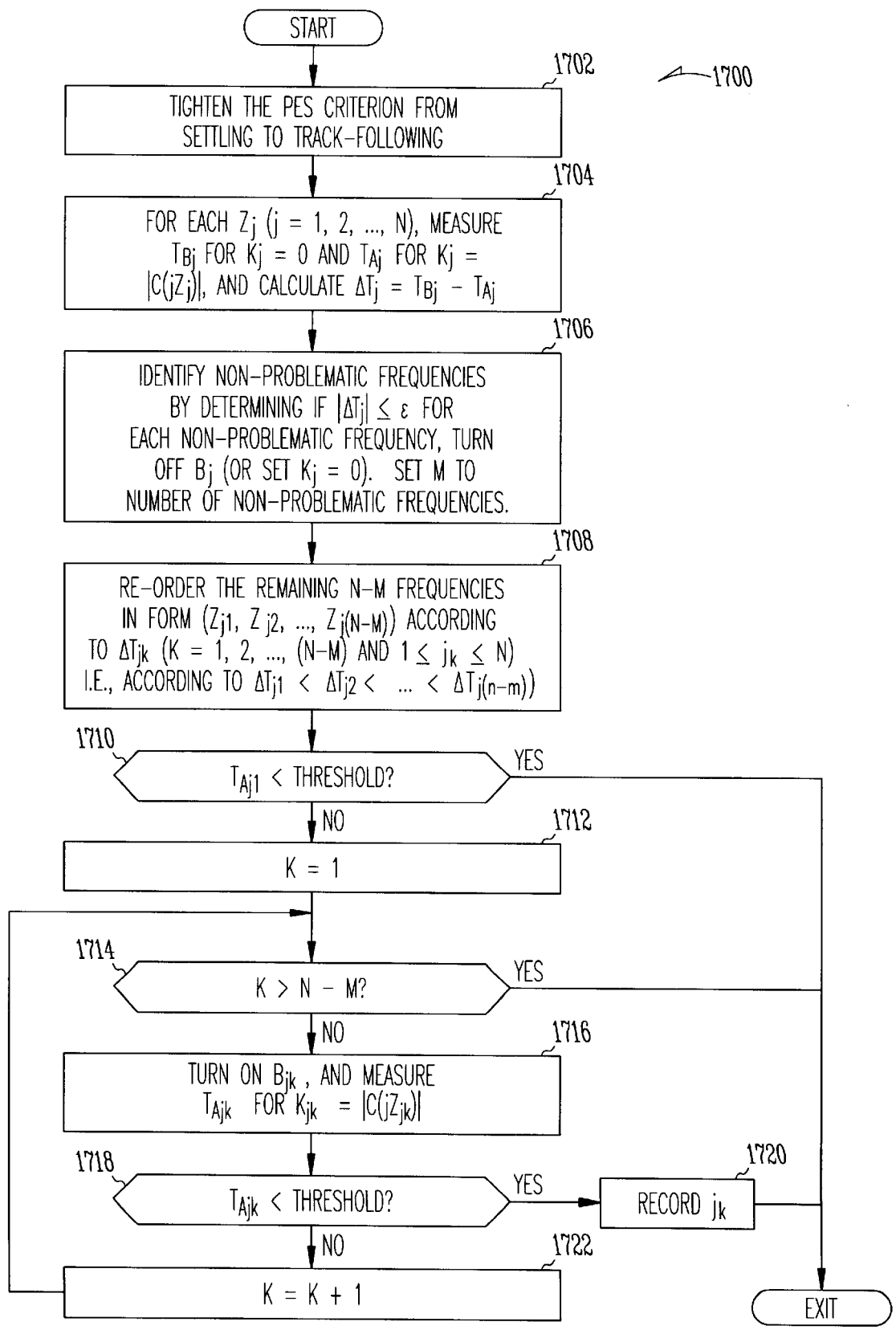
FIG. 17 is a flow diagram illustrating a simplified PCA (SPCA) method for identifying the resonance frequencies that actually appear during the seek settling process in accordance with another embodiment of the present invention.

In PCA method 1600, a large number of seek settling times may need to be measured to identify all of the problematic resonance frequencies that may appear. In the worst case, there may be N! times settling measurements. For a relatively large number of possible problematic resonance frequencies in the resonance frequency list (e.g., N=16 or 32), PCA method 1600 may thus be time consuming. For faster operation than that of PCA method 1600, a simplified PCA (SPCA) based screening method 1700 for identifying resonance frequencies that actually appear during settling by measuring slow settling times is shown in FIG. 17. As with PCA method 1600, SPCA method 1700 is repeated for each zone, and for each head.

At step 1702, the CPU tightens the PES criterion from seek settling to track following. Tightening the PES settling criterion causes a more sensitive correlation between resonance frequency and the settling time. At step 1704, for each frequency in the resonant frequency list $Z_j$ (j=1, 2, ..., N), the CPU measures the slow settling time $T_{Bj}$ and $T_{Aj}$ for $K_j=0$ and for $K_j=|C(jZ_j)|$, respectively, and calculates the difference in the settling times for each frequency $Z_j$ using $\Delta T_j=T_{Bj}-T_{Aj}$. In other words, the CPU calculates the difference between the settling time with active damping (i.e., with $K_j=|C(jZ_j)|$) and the settling time without active damping (i.e., with $K_j=0$) for each of the possible problematic resonance frequencies in the list.

At step 1706, the CPU identifies the non-problematic frequencies in the resonance frequency list by determining if $|\Delta T_j| \leq \epsilon$, where $\epsilon$ is a threshold value which indicates that the particular frequency $Z_j$ will not adversely impact the seek settling time. For each frequency identified as being non-problematic, the CPU turns off the bandpass filter $B_j$ or, alternatively, sets the constant gain $K_j$ to 0. The CPU then sets M to the number of non-problematic frequencies, where M<N. At this point, there are N–M remaining frequencies from the resonance frequency list.

At step 1708, the CPU re-orders the remaining N–M frequencies $Z_j$ in the following form: $Z_{j1}, Z_{j2}, \ldots, Z_{j(N-M)}$. These frequencies $Z_j$ are re-ordered according to $\Delta T_{jk}$ (k=1, 2, ..., (N–M) and $1 \leq j_k \leq N$). In other words, according to $\Delta T_{j1} < \Delta T_{j2} < \ldots < \Delta T_{j(N-M)}$. Thus, in step 1708, the N–M frequencies $Z_j$ remaining after the screening process of step 1706 are re-ordered in the descending order of their settling times.

At step 1710, the CPU determines if the maximum settling time when a single bandpass filter 1314$_{j1}$ is applied one by one (i.e., when the bandpass filter 1314 for the remaining principal frequency component is turned on) is less than a given threshold that defines an acceptable seek settling time (i.e., $T_{Aj1}$<Threshold?). If so, the settling time requirement has been met (i.e., the maximum seek settling time is acceptable), and SPCA method 1700 exits. If not, at steps 1712 and 1714, the CPU sets an index k to 1 and checks whether index k is greater than the number N–M of remaining frequencies. If so, SPCA method 1700 exits. If index k is not greater than N–M then, at step 1716, the CPU turns on the bandpass filter $B_{jk}$, and measures the slow settling time $T_{Ajk}$ for $K_{jk}=|C(jZ_{jk})|$. At step 1718, if the slow settling time $T_{Ajk}$ is less than the given threshold that defines an acceptable seek settling time, $j_k$ is recorded at step 1720, and SPCA method 1700 exits. Otherwise, at step 1722, the CPU increments index k and returns to step 1714. By repeating the loop formed by steps 1714, 1716, 1718 and 1722, the CPU sequentially turns on the corresponding bandpass filters according to the descending order of the settling time sequence determined at step 1708. The screening process of SPCA method 1700 stops when the seek settling time requirement is met, and the frequencies which are responsible for the satisfactory settling performance are identified and recorded.

In PCA method 1600 described above in relation to FIG. 16, each resonance frequency $Z_j$ in the resonance frequency list $Z_j$ (j=1, 2, ..., N) has a single value that represents one mechanically-known resonance frequency of a particular type of disc drive. In reality, the actual frequency corresponding to each resonance frequency in the resonance frequency list may vary from disc drive to disc drive. In other words, while there mechanically exists only one frequency for a particular resonance mode in a particular type of disc drive, the actual value of the resonance frequency for that resonance mode will be different from disc drive to disc drive. For example, while the arm bending mode resonance frequency may have a nominal value of 930 Hz for a particular type of disc drive, the actual arm bending mode resonance frequency for five different disc drives of that type may be 929, 929.5, 930, 930.5 and 931 Hz.

In one embodiment, PCA method 1600 is configured to handle the variations in actual resonance frequencies from disc drive to disc drive by using a resonance frequency list including all of the typical resonance frequency values. For example, the resonance frequency list could include the following frequencies: 929 Hz; 929.5 Hz; 930 Hz; 930.5 Hz and 931 Hz. Of course, the list would also include any of the other possible problematic resonance frequencies. Then, PCA method 1600 would screen all of these possible resonance frequencies to identify which are problematic. This configuration of PCA method 1600 to handle this problem is time consuming.

Thus, in another embodiment of the invention, drive-to-drive variations in the actual resonance frequencies are effectively handled by modifying method 1600. Recall that, in method 1600, each entry in the resonance frequency list $Z_j$ (j=1, 2, ..., N) has a single value representing one mechanically-known resonance frequency (e.g., 930 Hz). In the modified version of method 1600, each entry in the resonance frequency list is re-defined as representing the representative or nominal value of a group of nearby resonance frequencies that are referred to as "group $Z_j$". In each "group", there are multiple discrete frequencies which are all near the nominal value of the mechanically-known resonance frequency. For example, assume there are five typical resonance frequency values for a particular resonance frequency mode (e.g., 929, 929.5, 930, 930.5 and 931 Hz for the arm bending resonance mode). In this case, the entry in the resonance frequency list corresponding to the arm bending mode is defined as the "group 930 Hz". PCA method 1600 is then modified such that, once one of the frequencies in this group has been screened out (i.e., has been identified as the trouble-making frequency), the modified method skips screening of the remaining members of this group, and jumps to the next group. The remaining members of this group are skipped since, for a given mechanically-known resonance frequency, a given disc drive will have only one actual resonance frequency. For example, if the frequency 929.5 Hz is identified as the trouble-making frequency in the "group 930 Hz", there is no need to screen any of the remaining frequencies in this group. Since the modified method does not need to screen all of the member frequencies in the "group $Z_j$", the amount of processing that needs to be performed is reduced. Note that PCA method 1600 can be thought of as a simplified version of this modified method, with each "group" defined as having only a single member.

In another embodiment of the invention, SPCA method 1700 (described above in relation to FIG. 17) is also modified to effectively handle the variations in resonance frequencies from disc drive to disc drive by re-defining each entry in the resonance frequency list as representing the nominal value of a group of nearby resonance frequencies that are referred to as "group $Z_j$". In each "group", there are again multiple discrete frequencies which are all near the nominal value of a single mechanically-known resonance frequency. Once one of the frequencies in each group has been screened out as the trouble-making frequency, the modified method skips screening the remaining members of the group, and jumps to the next group. Thus, not all of the member frequencies in each group will need to be screened. Note that SPCA method 1700 can be thought of as being a simplified version of this modified method, with each "group" being defined as having only a single member.

Figure 18:
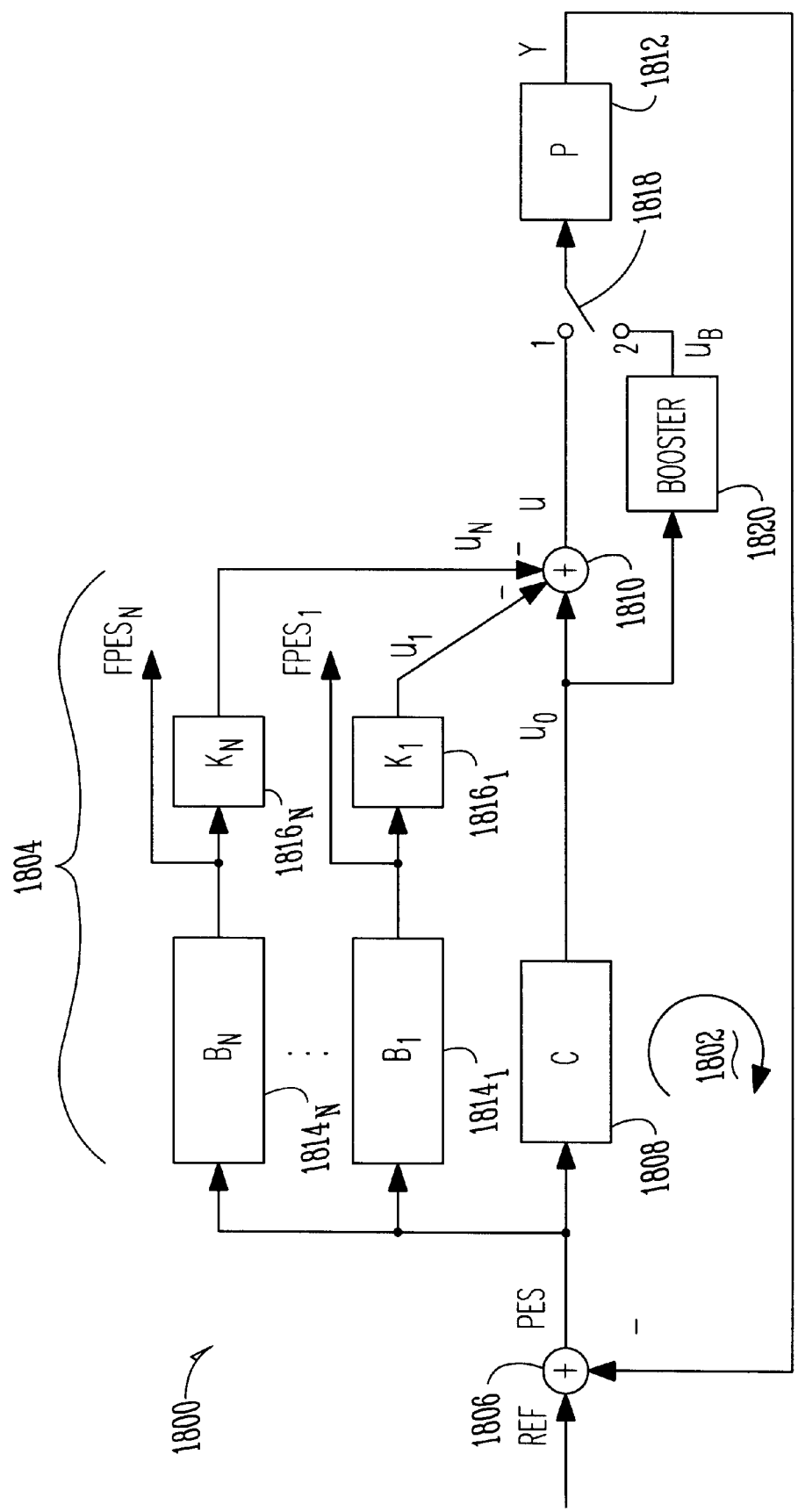
FIG. 18 is a schematic representation of a disc drive control loop according to another embodiment of the present invention, including a variable frequency and controllable gain booster for use in identifying multiple resonance frequencies.

Referring to FIG. 18, in another embodiment, disc drive controller 502 executes a disc drive control loop 1800 that uses active damping to handle multiple resonance frequencies that may appear during disc drive operation, and includes a variable frequency and controllable gain booster to identify resonance frequencies.

Disc drive control loop 1800 includes a servo control loop 1802 and multiple feedforward compensation paths 1804. Servo control loop 1802 includes a first difference element 1806, a servo controller 1808, a second difference element 1810, a power amplifier and plant 1812 for driving actuator assembly 408, and a booster switch 1818 with normal (No. 1) and test (No. 2) positions. First difference element 1806 subtracts a sensed position signal (Y) from a reference position signal (REF) to generate a position error signal (PES) for arm 412. Servo controller 1808 monitors the position error signal (PES) and generates a servo control signal ($U_O$) from the PES by performing conventional computations. Second difference element 1810 subtracts feedforward compensation signals ($U_1 \ldots U_N$) from paths 1804 from servo control signal ($U_O$) to generate a control signal (U) which, during normal operation (i.e., with switch 1818 in position no. 1), is applied to plant 1812. Each path 1804 includes a bandpass filter 1814j and a gain element 1816$_j$, where j=1, 2, . . . , N. For each path 1804, filter 1814$_j$ provides bandpass filtering of the position error signal (PES) and gain element 1816$_j$ multiplies the output from its filter 1814$_j$ by a gain $K_j$ to generate the feedforward compensation signal ($U_j$) for that path. Compensation signals ($U_j$, j=1, 2, . . . , N) are subtracted from servo control signal ($U_O$) by difference element 1810. The N center frequencies of bandpass filters 1814$_j$ are set to the N possible problematic actuator resonance frequencies. During normal operation, control loop 1800 thus operates in the same manner as control loop 1300 (FIG. 13).

Control loop 1800 also includes a variable frequency and controllable gain booster 1820 that receives the servo control signal ($U_O$) as an input and generates a boosted control signal ($U_B$) as an output. During normal operation (i.e., switch 1818 in position no. 1), booster 1820 is effectively disconnected from control loop 1800. During test operation (i.e., switch 1818 in position no. 2), the boosted control signal ($U_B$) from booster 1820 is applied to plant 1812 in place of the normal control signal (U). At the same time, the feedforward compensation signals ($U_1 \ldots U_N$) are cut off from servo control loop 1802 to eliminate active damping provided by paths 1804. Bandpass filters 1814$_j$, however, still operate to filter the position error signal (PES). In one embodiment, the outputs from bandpass filters 1814$_j$ are directly available to be monitored as filtered PES signals FPES$_j$. In another embodiment, the outputs are indirectly available to be monitored as signals $U_j$, which are proportional to FPES$_j$.

Figure 19:
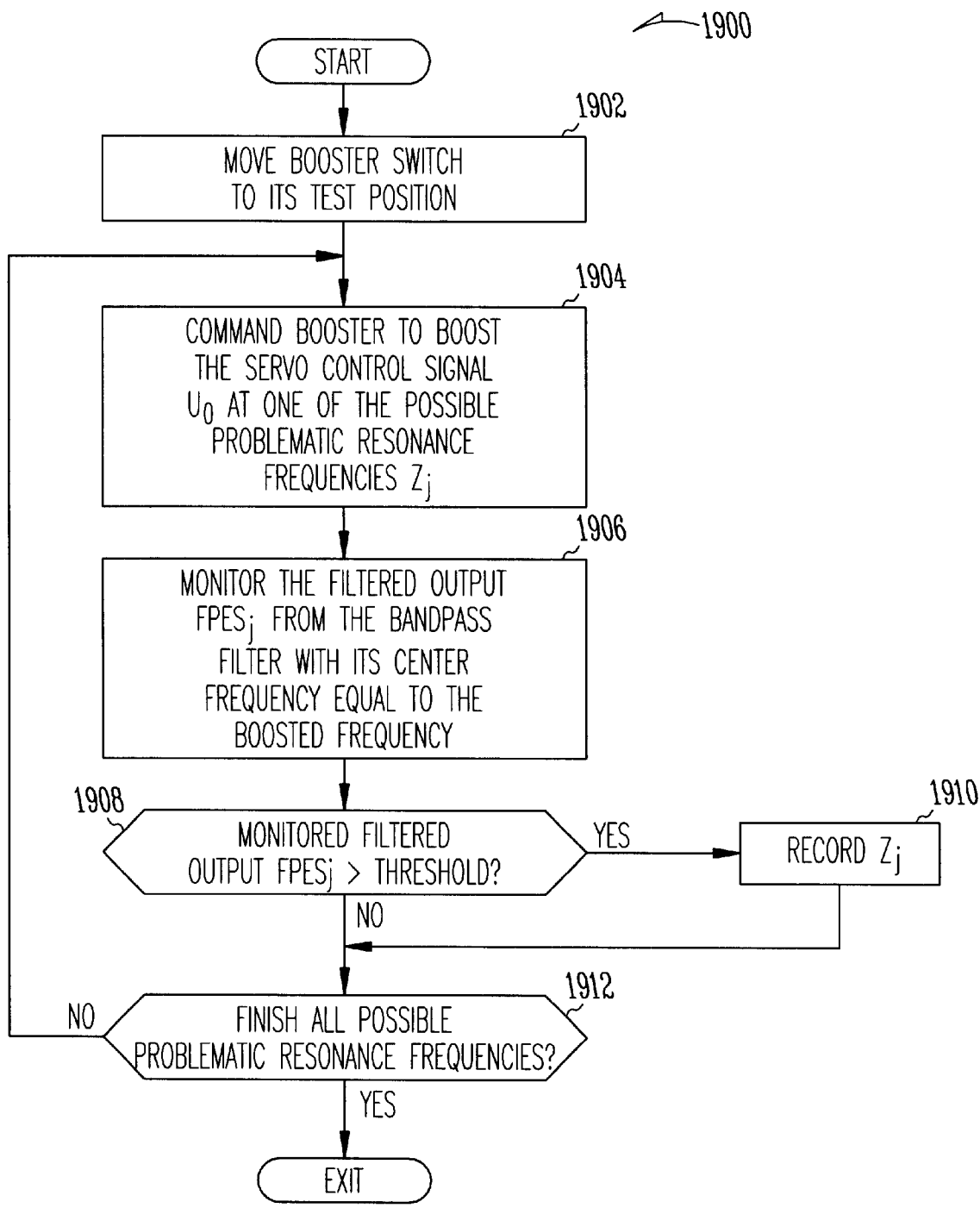
FIG. 19 is a flow diagram illustrating a method for identifying the resonance frequencies that actually appear during the seek settling process in accordance with yet another embodiment of the present invention.

Referring to FIG. 19, a method 1900 for identifying resonant frequencies that actually appear during settling (or other movements of arm 412, such as track following) is shown. At step 1902, booster switch 1818 is moved to its test position (no. 2) to include booster 1820 in servo control loop 1802. At step 1904, booster 1820 is commanded to boost the servo control signal ($U_O$) at one of the possible problematic resonance frequencies $Z_j$ in the resonance frequency list to generate the boosted control signal ($U_B$). For example, booster 1820 is commanded to provide an added gain of approximately 5.0 dB at the arm bending mode resonance frequency of about 930 Hz. The amount of the additional gain can be commanded to different values depending upon the application. At step 1906, the position error signal (PES) is monitored to determine the effect of the boost on the position error signal (PES) at the boosted frequency. In particular, the filtered output FPES$_j$ from the bandpass filter 1814$_j$ with its center frequency set equal to the boosted resonance frequency is monitored. Alternatively, the output $U_j$ from the respective gain element $K_j$ (which is proportional to FPES$_j$) is monitored. If a particular disc drive 400 has less margin at the resonant frequency that was introduced by booster 1820 and monitored by the corresponding bandpass filter 1814$_j$, the disc drive will become unstable and start to vibrate at the resonant frequency after booster 1820 is included in the servo control loop 1802. In this case, the filtered output FPES$_j$ (or $U_j$) will have a large amplitude. For improved accuracy, the position error signal (PES) is monitored over multiple (e.g., four) revolutions of the disc, and the monitored filtered output FPES$_j$ (or $U_j$ is averaged over the multiple revolutions. At step 1908, the result is compared with a threshold to determine whether that particular resonance frequency is problematic. If so, at step 1910, the boosted frequency is recorded since it is problematic. At step 1912, this process is repeated for each of the other possible problematic resonance frequencies in the resonance frequency list. Once each of these possible resonance frequencies has been tested, method 1900 exits since all of the possible problematic resonance frequencies that actually appear have been identified and recorded.

Once the problematic resonance frequencies have been identified for each zone and for each head using one of the above-described methods, including how many and which resonance frequencies are actually problematic, the corresponding feedforward compensation paths 1304 shown in FIG. 13 (or paths 1804 in FIG. 18 with switch 1818 in its normal position no. 1) are turned on. In particular, for each problematic resonance frequency, the corresponding feedforward compensation path 1304 (or 1804) is turned on to provide active damping for that resonance frequency. Also, for each resonance frequency which is identified as being non-problematic, the corresponding feedforward compensation path 1304 (or 1804) is turned off. A path 1304 (or 1804) is turned on by executing that particular path. A path 1304 (or 1804) is turned off in any of several different ways. In one embodiment, a path 1304 is turned off by configuring the disc drive controller or CPU to not execute the path, thereby conserving processing resources which can then be applied to other tasks. In another embodiment, a path 1304 (or 1804) is turned off by setting the gain $K_j$ for that path to 0. After the appropriate paths 1304 (or 1804) are turned on and off, the settling time of the disc drive will remain within the disc drive's specification.

Thus, since plural resonance frequencies are known a priori, a zone-dependent selective switching on/off matrix or table is built using any of a number of methods for identifying problematic resonance frequencies that actually appear. The on/off matrix or table is then used to turn on a selected number of bandpass filters to construct feedforward compensation signals from the position error signal (PES). These signals are, in turn, subtracted from the VCM control signal.

Figure 20:
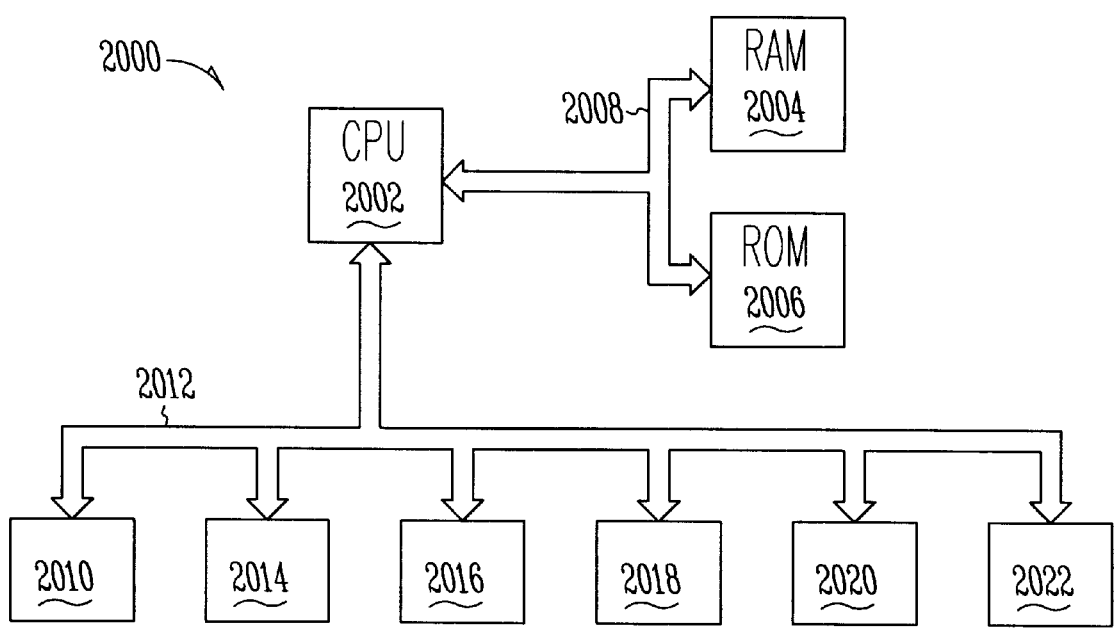
FIG. 20 is a schematic view of a computer or information handling system having one or more disc drives that use active damping to handle resonance effects.

Referring to FIG. 20, a computer system 2000 includes one or more disc drives that use active damping for handling resonance effects. System 2000, which may be referred to as an electronic system or as an information handling system, includes a central processing unit (CPU) 2002, a random access memory (RAM) 2004, a read only memory (ROM) 2006 and a system bus 2008 for communicatively coupling CPU 2002 with RAM 2004 and ROM 2006. System 2000 includes one or more disc drive devices 2010 (one shown in FIG. 20) including the active damping feature described above, and an input/output (I/O) bus 2012 for communicatively coupling CPU 2002 with disc drive device(s) 2010. Any type of disc drive may use the method for handling resonance effects using active damping as described above. System 2000 may also include other peripheral devices, such as devices 2014–2022, attached to bus 2012. Devices 2014–2022 may include other disc drives, magneto optical drives, floppy disc drives, monitors, keyboards and other peripherals.

Conclusion

A method of handling multiple resonance frequencies in a disc drive 400 includes the steps of monitoring a position error signal (PES) for an actuator arm 412 of a disc drive 400, generating a plurality of feedforward compensation signals ($U_1, \ldots, U_N$) from the position error signal (PES) using a plurality of bandpass filters $1314_j$ (j=1, ..., N), and applying the compensation signals ($U_1, \ldots, U_N$) to a servo control signal ($U_0$). In one embodiment, the monitoring step includes receiving a sensed position signal (Y) from a transducer 418 coupled to arm 412 and subtracting the sensed position signal from a reference position signal (REF). Each bandpass filter $1314_j$ (j=1, ..., N) has a center frequency that is set to a problematic resonance frequency that appears during seek settling or track following. The generating step includes using a gain element $1316_j$ with each bandpass filter $1314_j$ to generate each compensation signal ($U_1, \ldots, U_N$). Each gain element $1316_j$ provides a constant gain equal to the gain of the controller 1308 which generates the servo control signal ($U_0$) at the corresponding frequency passed by that bandpass filter $1314_j$. The applying step includes subtracting the feedforward compensation signals ($U_1, \ldots, U_N$) from the servo control signal ($U_0$). The method also includes providing the compensated servo control signal (U) to an assembly 408 for actuating the arm 412, and may also include the step of identifying the problematic resonance frequencies for the drive.

A method 1400 of identifying problematic resonance frequencies in a disc drive 400 includes the steps of commanding a movement of an actuator arm 412 of a disc drive (step 1404), collecting data points for a position error signal (PES) for the arm 412 that are associated with the movement (step 1406), and performing a digital fourier transform (DFT) of the position error signal (PES) data points to identify the actual resonant frequencies (step 1414). In one embodiment, the commanding step includes commanding a seek to a target track (step 1404), and the collecting step includes collecting the PES data points during seek settling (step 1406). In another embodiment, the commanding step includes commanding arm 412 to perform track-following, and the collecting step includes collecting the PES data points during the track-following. The method 1400 also includes the steps of loosening a criterion for the PES from seek to settling (step 1402), and tightening the criterion from settling to track-following (step 1410) to increase the collection of PES data points.

A method 1500 of identifying problematic resonance frequencies in a disc drive 400 includes the steps of commanding a movement of an actuator arm 412 of a disc drive (step 1504), collecting zero-crossings data for a PES for the arm 412 that are associated with the movement (step 1506), and analyzing the data to identify the actual resonant frequencies (step 1514). In one embodiment, the commanding step includes commanding a seek to a target track (step 1504) and the collecting includes collecting the PES zero-crossings data during seek settling (step 1506). In another embodiment, the commanding step includes commanding arm 412 to perform track-following, and the collecting step includes collecting the PES data during the track-following. The method 1500 includes loosening a criterion for the PES from seek to settling (step 1502), and tightening the criterion from settling to track-following (step 1510) to increase the collection of the data. In one embodiment, the collecting includes counting PES zero-crossings to obtain an estimate of a dominant frequency appearing in association with the movement of actuator arm 412, and the analyzing step includes comparing the estimate to a set of mechanically-known resonance frequencies and identifying at least one member of the set based on the estimate.

A method 1600 of identifying problematic resonance frequencies in a disc drive 400 includes the steps of defining a resonance frequency list $Z_j$ (j=1, 2, ..., N) including a plurality of possible problematic resonance frequencies that may appear during operation of a disc drive, and performing a principal components analysis to identify problematic resonance frequencies included in the list that actually appear (steps 1604–1618). In one embodiment, the performing step includes measuring a maximum slow settling time when successively turning on and off the possible problematic resonance frequencies in the list (steps 1606–1608). The performing step may also include, for each possible problematic resonance frequency in the list, measuring a first settling time without compensation for the resonance frequency, measuring a second settling time with compensation for the resonance frequency, and taking the difference between the first and second settling times (step 1606), and determining the principal frequency component in the list by finding the maximum difference between the first and second settling times (step 1608). Once the principal frequency component is determined, the performing step also includes turning on a bandpass filter to provide compensation for the principal frequency component and removing the principal frequency component from the list (step 1612) and, after removing the principal frequency component from the list, repeating the procedure of steps 1606, 1608 and 1612 to find the next principal frequency component (steps 1606–1618). The repeating step stops when turning on the bandpass filter for each of the principal frequency components that have been determined results in the settling time being less than an acceptable settling time (step 1610), and recording the principal frequency components whose filters were responsible for the settling time being less than the acceptable settling time (step 1618). In one embodiment, the performing step includes tightening a criterion for a position error signal (PES) for an actuator arm 412 of the drive to cause a more sensitive correlation between resonance frequency and settling time (step 1602). In one embodiment, one or more of the possible problematic resonance frequencies in the list are single values that each represent one mechanically-known resonance frequency. Alternatively, one or more of the possible problematic resonance frequencies represent a nominal value of a group of multiple discrete possible resonance frequencies which are all nearby the nominal value of a mechanically-known resonance frequency. In this embodiment, the performing step includes screening out one frequency in each group as being problematic, and then skipping screening of the remaining frequencies in the group.

A method 1700 of identifying problematic resonance frequencies in a disc drive 400 includes the steps of defining a resonance frequency list $Z_j$ (j=1, 2, . . . , N) including a plurality of possible problematic resonance frequencies that may appear during operation of a disc drive 400 and, for each possible problematic resonance frequency in the list, measuring a first settling time without compensation for the resonance frequency, measuring a second settling time with compensation for the resonance frequency, taking the difference between the two settling times (step 1704) and determining if the resonance frequency is non-problematic by comparing the magnitude of the difference to a threshold value (step 1706). Method 1700 also includes performing a principal components analysis of the possible problematic resonance frequencies that remain after determining the non-problematic resonance frequencies to identify the problematic resonance frequencies that actually appear (steps 1708–1722). The method also includes, for each of the possible problematic resonance frequencies determined to be non-problematic, turning off compensation for that frequency before performing the principal components analysis of the remaining frequencies (step 1706). The performing step includes re-ordering the remaining possible problematic resonance frequencies in the list according to descending order of their settling times (step 1708). The performing step also includes sequentially turning on a bandpass filter corresponding to each of the remaining possible problematic frequencies according to the descending order of their settling times (step 1716) with each filter providing feedforward compensation. The performing step also includes, after turning on each bandpass filter, measuring a settling time and, if the settling time is less than a threshold value that defines an acceptable settling time, recording the resonance frequencies whose bandpass filters were responsible for the settling time being less than the acceptable settling time (steps 1716–1720). In one embodiment, the performing step includes tightening a criterion for a position error signal (PES) for an actuator arm 412 of the disc drive to cause a more sensitive correlation between resonance frequency and settling time. In one embodiment, one or more of the possible problematic resonance frequencies in the list are single values that each represent one mechanically-known resonance frequency. In another embodiment, one or more of these resonance frequencies represent a nominal value of a group of multiple discrete possible resonance frequencies which are all nearby the nominal value of one mechanically-known resonance frequency. In this embodiment, the performing step includes screening out one frequency in each group as a problematic resonance frequency, and then skipping the screening of the remaining frequencies that appear in the group.

A method 1900 of identifying problematic resonance frequencies in a disc drive 400 having a servo control loop 1802 for generating a servo control signal ($U_O$) based on a position error signal (PES) for an actuator arm 412 of the disc drive 400 includes the steps of defining a resonance frequency list $Z_j$ (j=1, 2, . . . , N) including a plurality of possible problematic resonance frequencies that may appear during operation of a disc drive 400, commanding a booster 1820 to boost the servo control signal ($U_O$) at one of the possible problematic resonance frequencies in the list to generate a boosted control signal ($U_B$) which is provided to an assembly 408 for actuating the arm 412 (steps 1902–1904), and monitoring the position error signal (PES) to determine if the frequency at which the servo control signal ($U_O$) was boosted by booster 1820 is problematic (steps 1906–1908). In one embodiment, the commanding step includes actuating a booster switch 1818 to move the booster 1820 into the servo control loop 1802 (step 1902). The monitoring step includes monitoring the output of a bandpass filter $1814_j$ for the position error signal (PES) that has a center frequency approximately equal to the frequency at which the servo control signal ($U_O$) was boosted (step 1906). The command and monitoring steps are repeated for each possible problematic resonance frequency (steps 1904–1912).

It is to be understood that the above description is intended to be illustrative, and not restrictive. Many other embodiments will be apparent to those of ordinary skill in the art upon reviewing the above description. The scope of the present invention should, therefore, be determined with reference to the appended claims, along with the full scope of equivalents to which such claims are entitled.

What is claimed is:

1. A method of handling multiple resonance frequencies in a disc drive comprising steps of:
    (a) monitoring a position error signal for an actuator arm of a disc drive;
    (b) generating a plurality of feedforward compensation signals from the position error signal and independent of a servo control signal using a plurality of bandpass filters, each bandpass filter having a center frequency set to a problematic resonance frequency for the disc drive; and
    (c) applying the plurality of feedforward compensation signals to the servo control signal.

2. The method of claim 1, wherein the generating step (b) includes (b)(i) using a gain element with each bandpass filter to generate each of the compensation signals.

3. The method of claim 2, wherein the servo control signal is generated by a controller having a controller gain at each of the problematic resonance frequencies, and the gain element used with each bandpass filter provides the controller gain at the corresponding problematic resonance frequency passed by that bandpass filter.

4. A method of handling multiple resonance frequencies in a disc drive comprising steps of:
    (a) monitoring a position error signal for an actuator arm of a disc drive;
    (b) generating, without a servo control signal, a plurality of feedforward compensation signals from the position error signal using a plurality of bandpass filters, each bandpass filter having a center frequency set to a problematic resonance frequency for the disc drive;
    (c) applying the plurality of feedforward compensation signals to the servo control signal; and
    (d) identifying the problematic resonance frequencies for the disc drive.

5. The method of claim 4, wherein the identifying step (d) includes:
    (d)(i) commanding a movement of the actuator arm of the disc drive;
    (d)(ii) collecting data points for the position error signal for the actuator arm that are associated with the movement; and
    (d)(iii) performing a digital fourier transform (DFT) of the collected position error signal data points to identify actual resonant frequencies.

6. The method of claim 5, wherein the commanding step (d)(i) includes (d)(i)(A) commanding a seek to a target track, and the collecting step (d)(ii) includes (d)(ii)(A) collecting the data points for the position error signal during seek settling.

7. The method of claim 6, further comprising steps of:
(e) loosening a criterion for the position error signal from seek to seek settling, and then (f) tightening the criterion from seek settling to track-following, thereby increasing the collection of data points for the position error signal.

8. The method of claim 4, wherein the identifying step (d) includes:
(d)(i) commanding a movement of the actuator arm of the disc drive;
(d)(ii) collecting zero-crossings data for the position error signal for the actuator arm that are associated with the movement; and
(d)(iii) analyzing the zero-crossings data to identify actual resonant frequencies.

9. The method of claim 8, wherein the commanding step (d)(i) includes (d)(i)(A) commanding a seek to a target track, the collecting step (d)(ii) includes (d)(ii)(A) collecting the zero-crossings data for the position error signal during seek settling, and further comprising steps of (e) loosening a criterion for the position error signal from seek to seek settling, and (f) tightening the criterion from seek settling to track-following, thereby increasing the collection of zero-crossings data.

10. The method of claim 8, wherein the collecting step (d)(ii) includes (d)(ii)(A) counting zero-crossings of the position error signal to obtain an estimate of a dominant frequency appearing in association with the movement, and the analyzing step (d)(iii) includes (d)(iii)(A) comparing the estimate to a set of known resonance frequencies and (d)(iii)(B) identifying at least one set member using the estimate.

11. The method of claim 4, wherein the identifying step (d) includes:
(d)(i) defining a resonance frequency list including a plurality of possible problematic resonance frequencies that may appear during operation of the disc drive; and
(d)(ii) performing a principal components analysis to identify problematic resonance frequencies included in the resonance frequency list that actually appear.

12. The method of claim 11, wherein the performing step (d)(ii) includes (d)(ii)(A) measuring a maximum slow settling time when successively turning on and off each of the possible problematic resonance frequencies in the resonance frequency list.

13. The method of claim 11, wherein the performing step (d)(ii) includes:
(d)(ii)(A) for each possible problematic resonance frequency in the resonance frequency list, measuring a first settling time without compensation for the resonance frequency, measuring a second settling time with compensation for the resonance frequency, and taking the difference between the first and second settling times;
(d)(ii)(B) determining the principal frequency component in the resonance frequency list by finding the maximum difference between the first and second settling times;
(d)(ii)(C) once the principal frequency component is determined, turning on a bandpass filter to provide compensation for the principal frequency component and removing the principal frequency component from the resonance frequency list;
(d)(ii)(D) after removing the principal frequency component from the resonance frequency list repeating steps (d)(ii)(A) through (d)(ii)(C) at least until turning on the bandpass filter for each of the principal frequency components that have been determined results in the settling time being less than an acceptable settling time; and
(d)(ii)(E) recording the principal frequency components whose bandpass filters were responsible for the settling time being less than the acceptable sealing time.

14. The method of claim 11, wherein the performing step (d)(ii) includes (d)(ii)(A) tightening a criterion for the position error signal for the actuator arm to cause a more sensitive correlation between resonance frequency and settling time.

15. The method of claim 11, wherein at least one of the possible problematic resonance frequencies represents a nominal value of a group of multiple discrete possible resonance frequencies which are all nearby the nominal value of one known resonance frequency, and performing step (d)(ii) includes (d)(ii)(A) screening out one frequency in the group as a problematic resonance frequency and (d)(ii)(B) skipping screening of a frequency in the group after screening out the one frequency.

16. The method of claim 4, wherein the identifying step (d) includes:
(d)(i) defining a resonance frequency list including a plurality of possible problematic resonance frequencies that may appear during operation of the drive;
(d)(ii) for each possible problematic resonance frequency in the resonance frequency list, measuring a first settling time without compensation for the resonance frequency, measuring a second settling time with compensation for the resonance frequency, taking the difference between the first and the second settling times, and determining if the resonance frequency is non-problematic by comparing the magnitude of the difference between the two settling times to a threshold value; and
(d)(iii) performing a principal components analysis of the possible problematic resonance frequencies that remain after determining the non-problematic resonance frequencies to identify the problematic resonance frequencies that appear.

17. The method of claim 16, wherein the performing step (d)(iii) includes:
(d)(iii)(A) re-ordering the remaining possible problematic resonance frequencies in the resonance frequency list according to descending order of their settling times;
(d)(iii)(B) sequentially turning on a bandpass filter corresponding to each of the remaining possible problematic frequencies according to the descending order of their settling times, each bandpass filter providing feedforward compensation; and
(d)(iii)(G) after turning on each bandpass filter in step (d)(iii)(B), measuring a settling time and, if the settling time is less than a threshold value that defines an acceptable settling time, recording the resonance frequencies whose bandpass filters were responsible for the settling time being less than the acceptable settling time.

18. The method of claim 16, wherein the performing step (d)(iii) includes tightening a criterion for the position error signal for the actuator arm to cause a more sensitive correlation between resonance frequency and settling time.

19. The method of claim 16, wherein at least one of the possible problematic resonance frequencies represents a nominal value of a group of multiple discrete possible resonance frequencies which are all nearby the nominal value of one known resonance frequency, and performing step (d)(iii) includes (d)(iii)(A) screening out one frequency in the group as a problematic resonance frequency and (d)(iii)(B), skipping screening of a frequency in the group after screening out the one frequency.

20. The method of claim 4, wherein the disc drive has a servo control loop for generating the servo control signal based on the position error signal for the actuator arm of the disc drive, wherein the identifying step (d) includes:

(d)(i) defining a resonance frequency list including a plurality of possible problematic resonance frequencies that may appear during operation of the drive;

(d)(ii) commanding a booster to boost the servo control signal at one of the possible problematic resonance frequencies in the list to generate a boosted control signal which is provided to an actuator assembly for actuating the actuator arm; and (d)(iii) monitoring the position error signal to determine if the frequency at which the servo control signal was boosted by the booster is problematic.

21. The method of claim 20, wherein the monitoring step (d)(iii) includes monitoring an output of a bandpass filter for the position error signal that has a center frequency approximately equal to the frequency at which the servo control signal was boosted.

22. A method comprising steps of:

(a) monitoring a position error signal;

(b) generating a plurality of compensation signals from the position error signal using a plurality of bandpass filters and a gain element with each bandpass filter, each bandpass filter having a center frequency set to a resonance frequency; and (c) applying the plurality of compensation signals to a servo control signal.

23. An apparatus comprising:

a servo controller coupled to receive a position error signal and configured to generate a control signal; and at least two bandpass filters each coupled to receive the position error signal and configured to generate respective compensation signals independent of the control signal, wherein the compensation signals are to be applied to the control signal.

24. The apparatus of claim 23 further comprising at least one gain element coupled to a one of the at least two bandpass filters.

* * * * *